(12) United States Patent
Maurus

(10) Patent No.: US 12,473,738 B2
(45) Date of Patent: Nov. 18, 2025

(54) BASIC UNIT, INFRASTRUCTURE FACILITY AND INFRASTRUCTURE SYSTEM

(71) Applicant: Tobias Maurus, Stuttgart (DE)

(72) Inventor: Tobias Maurus, Stuttgart (DE)

( * ) Notice: Subject to any disclaimer, the term of this patent is extended or adjusted under 35 U.S.C. 154(b) by 807 days.

(21) Appl. No.: 17/262,254

(22) PCT Filed: Jul. 23, 2018

(86) PCT No.: PCT/EP2018/069954
§ 371 (c)(1),
(2) Date: Jan. 22, 2021

(87) PCT Pub. No.: WO2020/020435
PCT Pub. Date: Jan. 30, 2020

(65) Prior Publication Data
US 2021/0348406 A1    Nov. 11, 2021

(51) Int. Cl.
*E04H 1/00*      (2006.01)
*B60L 53/30*     (2019.01)
(Continued)

(52) U.S. Cl.
CPC .......... *E04H 1/1233* (2013.01); *B60L 53/30* (2019.02); *E04B 1/24* (2013.01); *E04D 13/08* (2013.01);
(Continued)

(58) Field of Classification Search
CPC ....... E04H 1/1205; E04H 1/1233; E04H 6/00; E04H 6/025; E04H 6/04; E04B 1/24;
(Continued)

(56) References Cited

U.S. PATENT DOCUMENTS 3,060,519 A    10/1962  Francis
5,109,643 A     5/1992  Speers
(Continued)

FOREIGN PATENT DOCUMENTS

CN    203 308 123 U    11/2013
DE     42 13 414 A1    10/1993
(Continued)

OTHER PUBLICATIONS

Anonymous (Kreisbote.de), "Too blue and much too bright," XP093018415, online (Kreisbote.de), Created: Feb. 23, 2011— Updated: Oct. 27, 2012, 1 page.

*Primary Examiner* — Chi Q Nguyen
(74) *Attorney, Agent, or Firm* — ASLAN LAW, P.C.

(57) ABSTRACT

In order to provide a base unit, in particular a base unit for an infrastructure device, which on the one hand can be produced in a straightforward and cost-effective manner and on the other hand is visually pleasing and can withstand vandalism attempts, it is proposed that the base unit should comprise a plurality of support elements and one or more roof elements arranged on the support elements, wherein the support elements and/or the one or more roof elements are arranged, and designed, such that the one or more roof elements are, or can be, arranged so as to be spaced apart from a floor or ground surface by the supporting elements, wherein the base unit comprises water drainage and/or cable routing and/or a lighting region and/or roof elements arranged obliquely in relation to the direction of gravitational force.

18 Claims, 23 Drawing Sheets

(51) Int. Cl.
*E04B 1/24* (2006.01)
*E04D 13/08* (2006.01)
*E04H 1/12* (2006.01)
*E04H 6/02* (2006.01)

(52) U.S. Cl.
CPC ........ *E04H 6/025* (2013.01); *E04B 2001/249* (2013.01); *E04D 2013/0893* (2013.01)

(58) Field of Classification Search
CPC ....... E04B 2001/249; E04B 2001/2493; E04D 13/08; E04D 2013/0806; E04D 2013/0893
See application file for complete search history.

(56) References Cited

U.S. PATENT DOCUMENTS

| | | | |
|---|---|---|---|
| 5,152,109 A * | 10/1992 | Boers | E04H 3/24 |
| | | | 296/26.02 |
| 5,998,963 A | 12/1999 | Aarseth | |
| 6,193,154 B1 | 2/2001 | Phillips et al. | |
| 7,392,816 B2 | 7/2008 | Porter | |
| 7,913,710 B2 | 3/2011 | Bougioukos | |
| 8,011,140 B2 | 9/2011 | Durham | |
| 8,143,841 B2 * | 3/2012 | Gochenaur | H01M 10/46 |
| | | | 320/109 |
| 9,153,718 B2 * | 10/2015 | Richardson | E04H 6/10 |
| 9,777,482 B1 * | 10/2017 | Saleh | E04D 13/076 |
| 9,963,891 B2 * | 5/2018 | Maurus | B60L 53/51 |
| 9,988,818 B1 * | 6/2018 | Tanghongs | E04D 13/0643 |
| 10,020,772 B1 * | 7/2018 | Puri | H02S 10/40 |
| 10,055,706 B2 * | 8/2018 | Thramann | G06Q 20/10 |
| 2004/0074157 A1 | 4/2004 | Chazal | |
| 2010/0050541 A1 | 3/2010 | Bright | |
| 2011/0039310 A1 * | 2/2011 | Chevreux | C12P 17/04 |
| | | | 435/243 |
| 2011/0187310 A1 * | 8/2011 | Gochenaur | E04H 6/025 |
| | | | 52/173.3 |
| 2012/0131866 A1 * | 5/2012 | Batut | F24S 30/425 |
| | | | 52/173.3 |
| 2013/0042542 A1 * | 2/2013 | Welschholz | B60L 53/30 |
| | | | 52/173.3 |
| 2016/0190974 A1 * | 6/2016 | Dickey | E04H 6/025 |
| | | | 52/173.3 |
| 2017/0202155 A1 * | 7/2017 | Iwai | E04B 7/18 |
| 2018/0238043 A1 * | 8/2018 | Kuramoto | A01G 9/227 |
| 2019/0047430 A1 * | 2/2019 | Götz | B60L 53/14 |
| 2019/0100933 A1 * | 4/2019 | Volin | E04H 1/1205 |
| 2019/0169871 A1 * | 6/2019 | Mckibben | H02S 20/23 |

FOREIGN PATENT DOCUMENTS

| | | |
|---|---|---|
| DE | 10 2004 035756 A1 | 2/2006 |
| DE | 10 2008 052 827 A1 | 5/2010 |
| DE | 10 2012 015 192 A1 | 4/2013 |
| DE | 10 2011 056 651 A1 | 6/2013 |
| EP | 2594707 A2 | 5/2013 |
| WO | WO 2012110502 A1 | 8/2012 |
| WO | WO 2016026513 A1 | 2/2016 |
| WO | WO 2016118988 A1 | 8/2016 |

* cited by examiner

BASIC UNIT, INFRASTRUCTURE FACILITY AND INFRASTRUCTURE SYSTEM

RELATED APPLICATION

This application is a continuation of international application No. PCT/EP2018/069954 filed on Jul. 23, 2018, the entire contents of which are hereby incorporated by reference.

FIELD OF DISCLOSURE

The present invention relates to a base unit, in particular a base unit for an infrastructure device. Such a base unit is used in particular in infrastructure facilities which are used to supply people or objects with consumables. For example, filling stations for supplying vehicles with fuel and/or electricity are to be regarded as infrastructure facilities.

BACKGROUND

The present invention is based on the object of providing a base unit, in particular a base unit for an infrastructure device, which, on the one hand, can be produced in a straightforward and cost-effective manner and which, on the other hand, is designed to be visually appealing and can withstand vandalism attempts.

SUMMARY OF THE INVENTION

According to the invention, this object is achieved by a base unit having the features accordingly to at least one aspect of the claimed invention.

The base unit preferably comprises several support elements and one or more roof elements arranged on the support elements.

The support elements and/or the one or more roof elements are preferably arranged and designed in such a way that the one or more roof elements are arranged or can be arranged at a distance from a floor by means of the support elements.

The base unit preferably further comprises a water drainage and/or a cable routing and/or a lighting region and/or roof elements arranged obliquely in relation to the direction of gravitational force.

It may be favorable if all roof elements of the base unit are arranged obliquely in relation to the direction of gravitational force.

The roof elements of the base unit form in particular a roof of the base unit which is arranged obliquely in relation to the direction of gravitational force.

In particular, a main plane of extension of the one or more roof elements runs inclined and/or obliquely in relation to a horizontal direction.

In the context of this description and the appended claims, a horizontal direction is understood to mean, in particular, a direction running perpendicular to the direction of gravitational force.

The roof elements of the base unit and/or a roof formed by roof elements of the base unit preferably have a slope from a front side of the base unit to a rear side of the base unit.

It can be favorable if the one or more roof elements are arranged inclined at an angle of at least approximately 12° and/or at most approximately 18° to a horizontal direction.

The one or more roof elements are in particular arranged at an angle in the range from approximately 12° to approximately 18° to a horizontal direction.

Such a slope can preferably enable snow and/or dirt to slide off the roof elements and/or the roof.

In the context of this description and the appended claims, a front side of the base unit is preferably understood to mean a side of the base unit on which roof elements of the base unit and/or a roof formed by roof elements of the base unit are at a distance from a floor parallel to the direction of gravitational force which is greater than a distance between the roof elements and/or the roof from a floor on a rear side facing away from the front side of the base unit.

In the context of this description and the appended claims, a rear side of the base unit is therefore preferably understood to mean a side of the base unit on which roof elements of the base unit and/or a roof formed by roof elements of the base unit are at a distance from a floor parallel to the direction of gravitational force which is smaller than a distance between the roof elements and/or the roof from a floor on a front side facing away from the rear side of the base unit.

Preferably, people and/or users can be protected from the effects of the weather, in particular from precipitation, by roof elements of the base unit.

Electrical power cables and/or data cables can preferably be routed by means of the cable routing, for example to lighting elements arranged in the lighting region.

It may be favorable if, by means of the water drainage, liquid, in particular water, which in the event of precipitation hits roof elements of the base unit and/or a roof formed by roof elements of the base unit, e.g. as rain or snow, may be drained, for example to a sewer system.

In one embodiment of the base unit it is provided that the water drainage and/or the cable routing and/or the lighting region are arranged at least in portions in one or more support elements and/or on one or more support elements.

The water drainage and/or the cable routing and/or the lighting region preferably run at least in portions through one or more support elements, in particular along a longitudinal extension of the one or more support elements.

One or more support elements are preferably arranged and/or can be arranged obliquely in relation to a floor.

It may be favorable if the cable routing and/or the water drainage run at least in portions along a main direction of extension of the support elements.

The cable routing and/or the water drainage preferably run at least 50%, in particular at least 70%, along a main direction of extension of the support elements.

It may also be favorable if the water drainage and/or the cable routing and/or the lighting region run at least in portions in a metal profile of a support element.

Alternatively or in addition, it is conceivable that the water drainage and/or the cable routing and/or the lighting region run at least in portions in one or more metal profiles that can be arranged on support elements of the base unit, in particular in elongated profile elements.

The water drainage preferably comprises a plurality of water drainage portions, wherein water drainage portions of the water drainage are arranged on or in support elements of the base unit.

It may be favorable if the cable routing comprises a plurality of cable routing portions, wherein cable routing portions of the cable routing are arranged on or in support elements of the base unit.

Cable routing portions of the cable routing and/or water drainage portions of the water drainage preferably run at least 50%, in particular at least 70%, along a main direction of extension of the support elements.

The lighting region preferably comprises a plurality of lighting portions.

In one embodiment of the base unit, it is provided that the water drainage and/or the cable routing are arranged at least in portions behind a lighting region and/or at least in portions are covered by a lighting region.

Preferably, water drainage portions of the water drainage and/or cable routing portions of the cable routing are arranged behind a lighting region of the base unit in such a way that the water drainage portions and/or the cable routing portions can be hidden behind the lighting region.

Lighting regions of the base unit that cover water drainage portions and/or cable routing portions are preferably each arranged on or in support elements of the base unit.

In one embodiment of the base unit it is provided that a plurality of support elements of the base unit are arranged in a transverse direction along an imaginary line and each at least partially, in particular completely, overlap in an overlapping region in the transverse direction, wherein the water drainage and/or the cable routing at least in portions in run in the transverse direction, wherein the water drainage and/or cable routing running at least in portions in the transverse direction are arranged at least partially, in particular completely, within the overlapping region.

In the context of this description and the appended claims, a transverse direction is understood to mean, in particular, a direction along which a plurality of support elements of the base unit are arranged and thereby preferably completely cover one another, in particular when looking at a support element along the transverse direction.

It may be favorable if at least 50% of a cross-sectional area of the water drainage and/or the cable routing taken perpendicular to the transverse direction is arranged within the overlapping region.

Support elements that overlap in the transverse direction preferably form an envelope of the overlapping region.

It may also be favorable if water drainage portions of the water drainage and/or cable routing portions of the cable routing running in the transverse direction are arranged perpendicular to the transverse direction in front of and/or behind the support elements, in particular directly adjacent to the support elements.

It may be favorable here if water drainage portions of the water drainage and/or cable routing portions of the cable routing bear directly on the envelope of the overlapping region.

The water drainage and/or the cable routing may preferably be arranged on the base unit in a comparatively invisible manner in the transverse direction.

In one embodiment of the base unit it is provided that several support elements are arranged in a transverse direction along an imaginary line, wherein the support elements each partially, in particular completely, overlap with an outer contour in the transverse direction, wherein a water drainage line for the water drainage is arranged in the transverse direction within the outer contour of the support elements.

The water drainage line is in particular arranged completely within the outer contour of two external support elements of the base unit in the transverse direction.

Preferably, by providing the water drainage line when it rains on the roof elements and/or on a roof formed by the roof elements, liquid, in particular water, can be drained away by means of the water drainage line, wherein the water drainage line may be arranged provide an aesthetic overall impression of the base unit in the transverse direction within the outer contour of the support elements.

The water drainage line arranged at least partially, in particular completely, within the outer contour in the transverse direction is preferably a water drainage channel.

The water drainage line preferably comprises a profile that is open on one side, for example a rectangular profile that is open on one side and/or a U-profile.

The water drainage line preferably covers and/or delimits a cable routing portion of the base unit.

In one embodiment of the base unit it is provided that the base unit comprises three or more than three support elements, which are arranged in a transverse direction along an imaginary line, wherein the three or more than three support elements comprise two outer support elements in the transverse direction and one or more inner support elements arranged in the transverse direction between the outer support elements.

In one embodiment of the base unit it is provided that inner support elements arranged in the transverse direction between the outer support elements comprise a recess for a water drainage line of the water drainage.

It may be advantageous if the outer support elements completely cover and/or overlap the recess of the inner support elements in the transverse direction.

In one embodiment of the base unit it is provided that the roof elements comprise or form a liquid-tight cover layer, wherein a water drainage line of the water drainage is arranged at a point of the liquid-tight cover layer that is the lowest point in the direction of gravitational force.

For example, it is conceivable that the water drainage line is arranged in the region of a rear edge of the roof elements.

The rear edge of the roof elements is preferably arranged in a transverse direction at least approximately completely within an outer contour of the support elements.

Alternatively or in addition to this, it is conceivable that two edges of the roof elements facing away from one another, which are arranged in a main plane of extension of the roof elements, are arranged in a transverse direction completely outside an outer contour of the support elements.

It may be particularly advantageous if a liquid-tight top layer of the roof elements and/or a roof formed by the roof elements has a slope from the two edges of the roof elements arranged in a transverse direction completely outside the outer contour of the support elements to one water drainage line arranged in the transverse direction completely within the outer contour of the support elements.

It can thus preferably be ensured that liquid, in particular water, can be conducted to the water drainage line from the edges of the roof elements arranged in the transverse direction outside the outer contour of the support elements.

In one embodiment of the base unit it is provided that an elastic sealing element is arranged on a water discharge line of the water discharge, wherein one or more roof elements rest against the elastic sealing element.

In particular, it can be provided that one or more roof elements rest against the elastic sealing element on an upper side in the direction of gravitational force.

It may be favorable if the elastic sealing element is clamped between one or more roof elements and the water drainage line of the water drainage system.

It may be favorable if the elastic sealing element comprises EPDM rubber or cellular rubber or is formed therefrom.

In one embodiment of the base unit it is provided that a water drainage line of the water drainage is fixed by one or more roof elements on a water drainage line receptacle of the base unit.

One or more roof elements act on the water drainage line, preferably in the direction of the water drainage line receptacle.

It may be favorable if the water drainage line comprises a seam region on which the water drainage line has a seam, wherein one or more roof elements rest indirectly on the seam and/or on the seam region, in particular on an elastic sealing element arranged on the seam and/or seam region.

Preferably, a sheet metal angle element is arranged between the elastic sealing element and the water drainage line of the water drainage which is pressed by the one or more roof elements directly against the water drainage line.

The roof elements preferably comprise one or more solar elements and/or one or more glass elements.

The roof elements may in particular have a mass of at least approximately 100 kg and/or at most approximately 500 kg.

The water drainage line may therefore be fixed in the water drainage line receptacle in a vandalism-proof manner by means of the roof elements.

The water drainage line receptacle preferably comprises one or more angle elements, which are in particular each fixed on a side of the support elements facing the rear.

It can be favorable if the water drainage line is fixed to the one or more angle elements by means of one or more roof elements.

One or more spacer elements may be arranged between the angle elements and the water drainage line.

Preferably, through passage openings arranged in the angle elements for the passage of screws on a side of the angle elements facing away from the spacer elements and/or the water drainage line are masked by means of a cover plate not shown in the figures.

In one embodiment of the base unit it is provided that a water drainage line of the water drainage is arranged in a recess in one or more support elements and/or by means of one or more stop elements on one or more support elements.

The one or more stop elements comprise, for example, an angle element.

The recess in one or more support elements preferably forms a water drainage line receptacle.

The recess in one or more support elements is preferably open to an edge region of the support elements. The water drainage line can thus preferably be arranged in the recess in a particularly straightforward manner.

It may be favorable if several recesses in the support elements for receiving the water drainage line are arranged axially flush in the transverse direction.

As an alternative or in addition to recesses in one or more support elements, it can be provided that the water discharge line is arranged perpendicular to the transverse direction in front of and/or behind one or more support elements.

In one embodiment of the base unit, it is provided that one or more roof elements comprise and/or form a circumferential roof edge, wherein the lighting region comprises a roof edge lighting which is arranged along the circumferential roof edge.

One or more roof elements preferably form a coherent roof of the base unit.

It may be favorable if the coherent roof of the base unit comprises the circumferential roof edge, which is formed in particular by one or more roof elements.

In one embodiment of the base unit it is provided that the circumferential roof edge in a main plane of extension of the roof elements protrudes in a transverse direction away from outer support elements of the base unit and/or that the circumferential roof edge in a main plane of extension of the roof elements protrudes perpendicular to the transverse direction from one or more support elements.

It can be favorable if the circumferential roof edge protrudes away from all support elements in a main plane of extension of the roof elements.

In one embodiment of the base unit, it is provided that the roof edge lighting comprises one or more roof edge lighting elements which can be arranged on the circumferential roof edge.

A plurality of roof edge lighting elements can in particular be arranged next to one another on the circumferential roof edge, in particular attached onto the roof edge next to one another.

It may be favorable if roof edge lighting elements arranged on the roof edge and/or attached onto the roof edge can be screwed to the roof edge and/or to a bearing structure of a roof formed by the roof elements.

In one embodiment of the base unit, it is provided that each roof edge lighting element comprises one or more lighting elements.

It may be favorable if the roof edge lighting elements are plastic components.

Each roof edge lighting element preferably comprises an opaque region and a translucent region arranged on the opaque region.

The opaque region of a roof edge lighting element preferably forms a frame element for the translucent region.

The translucent region preferably comprises or is formed by a transparent element.

The opaque region and the translucent region of the roof edge lighting elements preferably delimit an interior space of the roof edge lighting elements.

One or more lighting elements of a roof edge lighting element are preferably arranged in the interior of the roof edge lighting elements.

Each roof edge lighting element preferably comprises a cable routing portion of the cable routing.

The cable routing portion of the roof edge lighting elements is arranged in particular in the opaque region of the roof edge lighting elements.

It may be favorable if cables can be passed through cable routing portions of roof edge lighting elements arranged next to one another on the circumferential roof edge.

Thus, lighting elements of the roof edge lighting can preferably be connected by means of a ring circuit.

It may be favorable if the base unit comprises an overhanging roof region which in the direction of gravitational force is and/or can be arranged on the circumferential roof edge above the roof edge lighting elements and in particular completely covers them.

By providing the overhanging roof region, the roof edge lighting elements, which are in particular plastic components, can preferably be protected from precipitation, for example from hail or snow.

In one embodiment of the base unit, it is provided that each support element comprises one or more at least approximately flat supporting elements which are or can be connected to one another.

The supporting elements are preferably arranged at least approximately parallel to one another.

As an alternative or in addition to this, at least edges of the supporting elements are arranged in a common plane.

It can be favorable if each support element comprises two supporting elements, wherein the two supporting elements preferably are connected to one another at least in a floor and/or foundation region facing away from the roof elements and/or in a roof region facing the roof elements.

The two supporting elements are preferably connected to one another only in a floor and/or foundation region facing away from the roof elements and/or only in a roof region facing the roof elements.

It may be favorable if each supporting element comprises or is formed from one or more bent sheet metal parts, in particular bent sheet metal parts with canted sheet metal edges. The two supporting elements are in particular hollow bent sheet metal parts. It may thus preferably be achieved that the cable routing and/or the water drainage are arranged at least partially within the supporting elements designed as hollow sheet metal parts.

In one embodiment of the base unit it is provided that the base unit comprises one or more roof supporting elements, wherein one or more roof elements each are supported by means of one or more roof supporting elements.

It may be beneficial if one or more roof elements are attached to one or more roof supporting elements.

It may furthermore be favorable if in each case a roof supporting element is connected to a supporting element of a support element, in particular fixed to the supporting element.

Preferably, one or more roof supporting elements have an integral or bonded connection to a respective support element and/or to a supporting element of a support element, for example are welded.

As an alternative or in addition to this, it is conceivable that one or more roof supporting elements are connected in a force-fitting or form-fitting manner to one or more support elements and/or to a supporting element of a support element.

One or more roof supporting elements are screwed to one or more support elements, for example.

In one embodiment of the base unit, it is provided that the one or more roof supporting elements are each arranged between two supporting elements of one or more support elements.

In one embodiment of the base unit it is further provided that the one or more support elements comprise bolt elements protruding in a transverse direction, wherein roof supporting elements are each attachable to a bolt element which is designed to support the roof supporting elements against the direction of gravitational force.

The bolt elements preferably protrude in the transverse direction away from supporting elements of the support elements.

The roof supporting elements may preferably be fixed on the bolt elements perpendicular to the direction of gravitational force.

In one embodiment of the base unit, it is provided that the roof supporting elements can be braced on the support elements perpendicular to the direction of gravitational force by means of the bolt elements.

Preferably, the bolt elements and/or the roof supporting elements each comprise a clamping cone, wherein the roof supporting elements are able to be clamped perpendicular to the direction of gravitational force on the clamping cone, for example by linear displacement of the roof supporting elements on the clamping cone, in particular by means of a screw element.

It may be favorable if two or more than two bolt elements are provided for the arrangement and/or fixing of a roof supporting element on a support element and/or on a supporting element of a support element. A torque support may preferably be provided by providing two or more than two bolt elements.

In one embodiment of the base unit, it is provided that one or more support elements include or are formed from one or more profile elements, in particular profile steel elements.

It may be favorable if all the support elements are formed by profile elements, in particular by profile steel elements.

In the context of this description and the appended claims, profile steel elements are understood to mean profile elements produced preferably by hot rolling.

The profile elements, in particular the steel profile elements, preferably have a material thickness in the range of from approximately 1 cm to approximately 10 cm, in particular in the range of from approximately 1 cm to approximately 5 cm, preferably approximately 1.5 cm.

It may be favorable if the support elements comprise hot-dip galvanized steel.

The support elements are preferably hot-dip galvanized.

Support elements of the base unit can preferably be produced in a particularly straightforward and cost-effective manner from hot-dip galvanized steel profile elements.

It may also be favorable if the support elements comprise cast metal components, in particular cast steel components, or are formed from them.

In one embodiment of the base unit, it is provided that one or more support elements include or are formed from one or more bent sheet metal parts, in particular bent sheet metal parts with canted sheet metal edges.

Bent sheet metal parts with canted sheet metal edges can preferably form supporting elements of one or more support elements.

The bent sheet metal parts preferably have a material thickness of at least approximately 1 mm and/or of at most approximately 5 mm.

Support elements can preferably be produced from bent sheet metal parts, in particular from bent sheet metal parts with canted sheet metal edges, with a particularly low cost of materials.

In one embodiment of the base unit it is provided that the base unit comprises a lighting device which has one or more elongated lighting elements, wherein one or more elongated lighting elements are arranged on one side of a support element and/or on two sides of a support element facing away from one another and/or wherein one or more elongated lighting elements are at least partially integrated into a respective support element.

In one embodiment of the base unit, it is provided that the lighting device comprises one or more elongated lighting elements which are arranged in an elongated profile element.

The elongated profile element preferably comprises a metal profile element or is formed by this.

The elongated profile element is, for example, a U-profile or a T-profile.

The elongated profile element preferably has a U-shaped or a T-shaped cross-section.

It may be favorable if the metal profile element is an extruded component.

In one embodiment of the base unit it is provided that the base unit comprises one or more elongated profile elements which are or can be arranged on one or more support elements, each of which includes a cable routing portion of the cable routing and/or a water drainage portion of the water routing, wherein the elongated profile elements each comprise a lighting portion of the lighting region which covers the cable routing portion and/or the water drainage portion.

It may be favorable if the elongated profile elements form lighting strip elements.

The elongated profile element is preferably a U-profile and in particular has a U-shaped cross-section.

It may be favorable if a separating profile element is provided which is or can be arranged in the elongated profile element for separating the lighting region from the cable routing portion and/or the water drainage portion.

The separating profile element is preferably a U-profile and in particular has a U-shaped cross-section.

The separating profile element is preferably opaque.

It may be favorable if an open region of the U-shaped separating profile element faces the elongated profile element when the separating profile element is arranged in the elongated profile element.

It may be favorable if the lighting portion is arranged on a side of the elongated profile element facing away from the cable routing portion and/or the water drainage portion.

The one or more elongated profile elements preferably comprise a lighting space in which one or more elongated lighting elements are arranged.

It may be favorable if the elongated profile elements each comprise translucent cover elements for covering the lighting space.

The translucent cover elements can preferably be clipped onto the elongated profile elements.

In one embodiment of the base unit, it is provided that each support element comprises two or more than two at least approximately flat supporting elements, wherein one or more elongated lighting elements are arranged in a lighting space between the two or more than two flat supporting elements, wherein one or more translucent cover elements are provided which cover the lighting room.

The translucent cover elements are preferably elongated.

It may be advantageous if a lighting space is arranged on each of two sides of the support elements facing away from one another.

In one embodiment of the base unit it is provided that one or more, in particular all, support elements comprise a stability space, one or more lighting spaces for receiving lighting elements and/or a cable routing space and/or fluid routing space arranged between the stability space and/or a respective lighting space.

The support elements preferably each comprise an in particular opaque lighting space wall element which separates the lighting space from the cable routing space and/or the fluid routing space.

It may be favorable if the lighting space wall element is arranged on the support element so that it can be folded and/or clipped in each case.

As an alternative or in addition to this, it is possible that the lighting space wall element is in each case formed by a separating profile inserted into a support element which separates the lighting space from the cable routing space and/or the fluid routing space.

It may be favorable if the separating profiles are produced and/or formed from an opaque material.

The separating profile preferably has an H-shaped and/or a U-shaped cross-section.

The cable routing space and/or the fluid routing space can thus preferably be hidden behind the lighting space.

It may be favorable if the base unit comprises one or more translucent cover elements which can be arranged on the support elements for covering the lighting space.

The translucent cover elements may preferably be connected to the support elements in a form-fitting and/or force-fitting manner, for example by clipping.

It can be favorable if the translucent cover elements can each be fixed to a support element by means of one or more clip rails and/or one or more clamping rails.

As an alternative or in addition to this, the translucent cover elements can be fixed to a support element by means of one or more screw rails.

The one or more screw rails may preferably be screwed to the support elements by screw elements, for example grub screws.

As an alternative or in addition to this, it is conceivable that a cable routing space and/or a fluid routing space are arranged in the stability space.

It may be beneficial in this case if the stability space is directly adjacent to one or more lighting spaces.

In one embodiment of the base unit, it is provided that a projection of an edge region of the one or more roof elements parallel to the direction of gravitational force forms an occupied area for people on a plane arranged perpendicular to the direction of gravitational force.

Persons and/or users are preferably protected by the base unit in the occupied area from the effects of the weather, in particular from precipitation or sunlight.

In one embodiment of the base unit, it is provided that the base unit comprises one or more rear wall elements and/or side wall elements arranged on the support elements, in particular fixed on the support elements.

The rear wall elements and/or the side wall elements preferably comprise or are formed from safety glass.

It may be favorable if side wall elements are arranged on outer support elements of the base unit in a transverse direction.

It may also be favorable if rear wall elements are arranged on all support elements on the rear side of the base unit.

The rear wall elements and/or the side wall elements preferably delimit an occupied area of the base unit.

People and/or users in the occupied area can preferably be protected from the effects of the weather, in particular from wind and/or precipitation.

It may also be favorable if the base unit comprises one or more front wall elements.

One or more front wall elements are preferably arranged on the front side of the base unit.

In particular, one or more roof elements and/or one or more side wall elements and/or one or more rear wall elements and/or one or more front wall elements delimit an occupied area.

The occupied area may preferably be temperature-controlled, in particular cooled or heated, by means of a temperature control device, for example by means of an air-conditioning system.

Side wall elements and/or rear wall elements and/or front wall elements of the base unit preferably run completely between roof elements of the base unit and a floor.

Side wall elements can preferably be formed at least partially by the support elements.

In one embodiment of the base unit, it is provided that the base unit comprises a foundation and/or a floor plate, wherein the support elements of the base unit are anchored or can be anchored to the foundation and/or to the floor plate.

It may be favorable if a foundation of the base unit is a foundation of an infrastructure device or is formed by it.

It may also be favorable if a floor plate of the base unit is or is formed by a floor plate of an infrastructure device.

In one embodiment of the base unit, it is provided that the support elements comprise a groove in which the cable routing runs at least in portions.

It may be favorable if the groove runs for at least 50%, in particular at least 70%, along a main direction of extension of the support elements.

The groove is arranged in particular on the back of the support elements.

The groove is preferably closed after one or more cables have been arranged in the groove.

In one embodiment of the base unit it is provided that the cable routing comprises one or more cable channel strips which can be fixed to the support elements in a form-fitting and/or force-fitting manner.

One or more cable channel strips can preferably be clipped onto the support elements on a rear side of the support elements.

In one embodiment of the base unit it is provided that the one or more roof elements form a coherent roof of the base unit, wherein an underside of the roof comprises a roof cladding.

It may be favorable if one or more ventilation openings are arranged in the roof cladding.

A cavity covered by the roof cladding can preferably be vented by providing the ventilation openings.

As an alternative or in addition to this, it is conceivable that a roof edge lighting of the base unit comprises one or more ventilation openings, by means of which a cavity covered by the roof cladding can be ventilated.

In one embodiment of the base unit, it is provided that the roof cladding comprises a film and/or a membrane.

The film and/or the membrane preferably comprise polyvinyl chloride (PVC), ethylene tetrafluoroethylene (ETFE), polytetrafluoroethylene (PTFE), a polyester fabric coated with polyvinyl chloride (PVC) and/or a polyester fabric coated with polytetrafluoroethylene (PTFE).

It may be favorable if the film and/or the membrane of the roof cladding are mechanically pretensioned.

As an alternative or in addition, the roof cladding comprises a sandwich component, in particular a sandwich sheet.

In one embodiment of the base unit, it is provided that all roof elements of the base unit are surrounded by a common support frame element in a main plane of extension of the roof elements.

The support frame element preferably forms a circumferential roof frame of the one or more roof elements.

It may be favorable if roof edge lighting elements of a roof edge lighting can be pushed onto the support frame element and/or can be fixed to the support frame element.

The base unit according to the invention is particularly suitable for use in an infrastructure device.

The present invention therefore also relates to an infrastructure device which comprises one or more base units according to the invention.

The infrastructure device preferably further comprises one or more infrastructure units, in particular one or more electric charging columns for charging electric vehicles.

The infrastructure device according to the invention preferably has one or more of the features and/or advantages described in connection with the base unit according to the invention.

The infrastructure device preferably forms a charging station for charging electric vehicles.

As an alternative or in addition to electric charging columns, it can be provided that the infrastructure device comprises one or more inductive charging devices for charging electric vehicles.

It may be favorable if the infrastructure device comprises one or more charging stations and/or one or more charging regions for charging electric vehicles.

A plurality of electric charging columns are preferably arranged along a transverse direction of the infrastructure device, in particular along a transverse direction of a respective base unit.

In one embodiment of the infrastructure device, it is provided that the infrastructure device comprises one or more photovoltaic elements, which are formed in particular by roof elements of the one or more base units.

As an alternative or in addition to this, it is possible that the infrastructure device comprises one or more photovoltaic elements which are arranged on roof elements of the one or more base units.

In one embodiment of the infrastructure device, it is provided that the infrastructure device comprises a collision protection device, by means of which one or more infrastructure units, in particular electric charging columns, are protected from a collision with a vehicle.

The collision protection device preferably surrounds the one or more infrastructure units at least partially, in particular at a distance of at least approximately 10 cm and/or at most approximately 100 cm, preferably at a distance in the range from approximately 10 cm to approximately 100 cm.

It is conceivable, for example, that the collision protection device comprises a curb delimitation, which surrounds the one or more infrastructure units.

As an alternative or in addition to this, the collision protection device can comprise one or more metal bracket elements.

In one embodiment of the infrastructure device, it is provided that the infrastructure device comprises one or more bench devices and/or one or more locker devices, wherein one or more bench devices and/or one or more locker devices each comprise a housing device, wherein one or more control devices and/or one or more inverter devices and/or one or more energy storage devices and/or one or more communication devices of the infrastructure device are arranged in the housing device.

It may be favorable if housing devices of one or more bench devices and/or one or more locker devices are arranged between support elements of the one or more base units in such a way that forces acting on the support elements in the transverse direction can be absorbed by the housing devices.

Preferably, the one or more bench devices and/or the one or more locker devices each comprise a height compensation device arranged in particular on the housing device of the respective bench device and/or locker device, by means of which unevenness of a floor and/or a floor slope for aligning a respective bench device and/or locker device can be compensated.

It can be favorable if a gradient of at least approximately 10° and/or at most approximately 25° can be compensated for by means of the height compensation device.

One or more base units of the infrastructure device can preferably be stiffened and/or stabilized by housing devices of one or more bench devices and/or one or more locker devices.

The bench devices preferably each include one or more seats.

It may be favorable if the locker device comprises one or more lockers.

The infrastructure device comprises, for example, one or more energy storage devices, in particular designed as a battery, by means of which electrical energy can be stored, in particular electrical energy generated by means of one or more photovoltaic elements of the infrastructure device.

Thus, people and/or users can preferably sit on the seats of the bench device, for example during a charging process, wherein a possibility can also be created to accommodate control devices and/or inverter devices and/or energy storage devices and/or communication devices of the infrastructure device in a vandalism-proof manner in the housing device of the bench device.

Preferably, one or more bench devices each include a bench temperature control device for temperature control of seats of the bench device, in particular a seat heating device for heating the one or more seats.

In one embodiment of the infrastructure device, provision is made for the housing devices of the one or more bench devices and/or of the one or more locker devices to each include a thermal insulation device.

Control devices and/or inverter devices and/or energy storage devices and/or communication devices arranged in the housing device can preferably be protected from temperature fluctuations by means of the thermal insulation device.

In one embodiment of the infrastructure device, it is provided that housing devices of the one or more bench devices and/or of the one or more locker devices can be anchored in a floor, in particular by means of one or more fastening elements.

Housing devices of the one or more bench seat devices and/or of the one or more locker devices can be anchored in a floor, for example by means of a threaded rod and/or a screw.

In one embodiment of the infrastructure device, it is provided that the housing devices of the one or more bench devices and/or the one or more locker devices have a receptacle for receiving one or more control devices and/or one or more inverter devices and/or one or more energy storage devices and/or one or more communication devices of the infrastructure device, wherein the receptacle is designed as a drawer.

In one embodiment of the infrastructure device, it is provided that housing devices of the one or more bench devices and/or the one or more locker devices form a collision protection device for one or more infrastructure units of the infrastructure device, in particular for one or more electric charging stations for charging electric vehicles.

In one embodiment of the infrastructure device, provision is made for housing devices of the one or more bench devices and/or of the one or more locker devices to form the collision protection device to be arranged between two electric charging columns for charging electric vehicles.

It may be favorable if electric charging columns of the infrastructure device are arranged along a transverse direction, wherein housing devices of the one or more bench devices and/or of the one or more locker devices have a greater width perpendicular to the transverse direction than the electric charging columns.

A distance between two housing devices of the bench device and/or the locker device in the transverse direction preferably corresponds to at most approximately 2 times the width, in particular at most approximately 1.5 times the width, of an electric charging column.

Preferably, by arranging housing devices of the bench device and/or the locker device adjacent to electric charging columns of the infrastructure device, a collision protection device for the electric charging columns can be formed.

In one embodiment of the infrastructure device it is provided that one or more infrastructure units are arranged completely within a projection of an edge region of the one or more roof elements of the one or more base units parallel to the direction of gravitational force on a plane arranged perpendicular to the direction of gravitational force.

In this case, all infrastructure units are preferably accessible to people and/or users and are protected from the effects of the weather, in particular from precipitation and/or sunlight.

In one embodiment of the infrastructure device it is provided that the infrastructure device comprises a foundation and/or a floor plate, wherein the support elements of the one or more base units are anchored in the foundation and/or in the floor plate.

The infrastructure device preferably has a cable channel in a transverse direction of one or more base units, which is arranged in the foundation and/or in the floor plate.

It may be favorable if a cable duct arranged in the foundation and/or in the floor plate is accessible for inspection purposes.

The infrastructure device can include, for example, an inspection shaft by means of which the cable duct is accessible and which can be covered, for example, by means of a fill of gravel.

In one embodiment of the infrastructure device, it is provided that the infrastructure device comprises one or more curbs which at least partially surround a foundation of the infrastructure device, and/or that the infrastructure device comprises a floor plate on which the support elements of the one or more base units are arranged, wherein the infrastructure device comprises floor edge lighting, which runs at least partially along the one or more curbs and/or along an edge of the floor plate.

In one embodiment of the infrastructure device, it is provided that the support elements of the one or more base units form one or more separating regions which are not passable by a vehicle, in particular by an electric vehicle.

The separation regions preferably adjoin one or more passable regions which are passable by a vehicle, in particular with an electric vehicle, and/or one or more occupied areas for people.

In one embodiment of the infrastructure device it is provided that the infrastructure device comprises one or more infrastructure units, each of which comprises a charging control unit and a charging cable unit, wherein the charging cable unit is arranged at a distance from the charging control unit and comprises a charging plug for charging an electric vehicle.

In the context of this description and the appended claims, an infrastructure unit which comprises a charging control unit and a charging cable unit, is preferably also understood to be an infrastructure unit for dispensing fuel and/or gas. A charging cable unit of the infrastructure unit corresponds in particular to a hose which, for example, comprises a fuel nozzle.

It may be favorable if the charging of the electric vehicle can be controlled by means of the charging control unit.

It may also be favorable if the charging cable unit comprises a delimiting element, for example a bollard.

A plurality of infrastructure units are preferably provided, each comprising a charging control unit and a delimitation element, wherein a plurality of delimitation elements preferably delimit an occupied area for people, which is in particular arranged within a projection of an edge region of the one or more roof elements.

One or more infrastructure units, which are designed as a sales station, for example as a vending machine, are preferably arranged in the occupied area.

It may also be favorable if at least the delimitation elements are also arranged within the projection of an edge region of the one or more roof elements.

Preferably, the roof elements can be used to provide a protected occupied area for people when charging electric vehicles, wherein electric vehicles that already have a roof can be arranged at least partially outside the projection of the edge region of the one or more roof elements.

In one embodiment of the infrastructure device, provision is made for charging control units of one or more infrastructure units to be arranged in the region of a roof formed by one or more roof elements of the one or more base units.

The charging control units are preferably fixed to a bearing structure of the one or more base units in the region of one or more roof elements.

In one embodiment of the infrastructure device, it is provided that the infrastructure device comprises one or more charging cable provision devices for providing a charging cable of an infrastructure unit.

It may be favorable if a charging cable can be provided in each case by means of an electrically operated or operable charging cable provision device at a charging position and/or in a charging region of the infrastructure device for charging an electric vehicle, in particular automatically and/or on request by a person and/or a user, preferably at the request of a person and/or a user on a charging control unit.

The charging cable provision device preferably comprises one or more, in particular electrically operated or operable charging cable resetting devices, by means of which a charging cable can be moved back from a charging position to a storage position.

The infrastructure device preferably comprises one or more charging cable receiving spaces, wherein charging cables from infrastructure units are able to be received in the charging cable receiving spaces.

It may be favorable if charging cables from infrastructure units can each be moved back into a charging cable receptacle space by means of a charging cable resetting device.

The charging cable receptacle space can be arranged, for example, in a foundation and/or in a floor plate of the infrastructure device.

It may also be favorable if the charging cable receptacle space is arranged on a roof formed by roof elements of the one or more base units.

The charging cable provision device preferably comprises an electrically operated or operable lock, which is designed to lock the charging cable receptacle space, in particular to lock a charging plug receptacle space.

It may therefore be favorable if the charging cable receptacle space, which is designed in particular to fully accommodate a charging plug, is only accessible when the electrically operated or operable lock of the charging cable provision device releases the charging cable receptacle space.

In one embodiment of the infrastructure device, it is provided that the infrastructure device comprises a sensor device for detecting an occupancy of one or more charging stations and/or one or more charging regions of the infrastructure device.

It may be favorable if the sensor device for detecting occupancy comprises one or more sensors and/or optical sensors, for example one or more cameras, arranged in a floor.

In one embodiment of the infrastructure device, it is provided that the infrastructure device comprises a control device by means of which a lighting situation of the infrastructure device can be controlled.

In particular, it may be advantageous if an occupancy of one or more charging stations and/or one or more charging regions of the infrastructure device can be displayed to people and/or users by lighting a lighting region of one or more base units.

Furthermore, a charge status of a battery of an electric vehicle can preferably be displayed to persons and/or users in a lighting region of one or more base units.

In one embodiment of the infrastructure device, it is provided that the infrastructure device comprises a charge status display for displaying a charge status of a battery of an electric vehicle to be charged and/or a charging function of an infrastructure unit, wherein the charge status display is arranged on or in a support element which is adjacent to a respective charging station and/or charging region.

In particular, it is thus possible to light support elements which are arranged adjacent to a charging station and/or a charging region.

The infrastructure device according to the invention is particularly suitable for use in an infrastructure system.

The present invention therefore also relates to an infrastructure system which comprises one or more infrastructure facilities according to the invention.

The base unit according to the invention and/or the infrastructure device according to the invention and/or the infrastructure system according to the invention can preferably also comprise one or more of the features and/or advantages described below:

The lighting region preferably comprises lighting elements embedded in a floor, which are designed to light one or more support elements.

The lighting elements embedded in the floor preferably comprise a translucent and/or tread-resistant cover.

Further features and/or advantages of the invention are the subject matter of the following description and the graphic representation of exemplary embodiments.

BRIEF DESCRIPTION OF THE DRAWINGS

In the drawings.

Identical or functionally equivalent elements are provided with the same reference numerals in all figures.

DETAILED DESCRIPTION OF THE DRAWINGS

Figure 1:
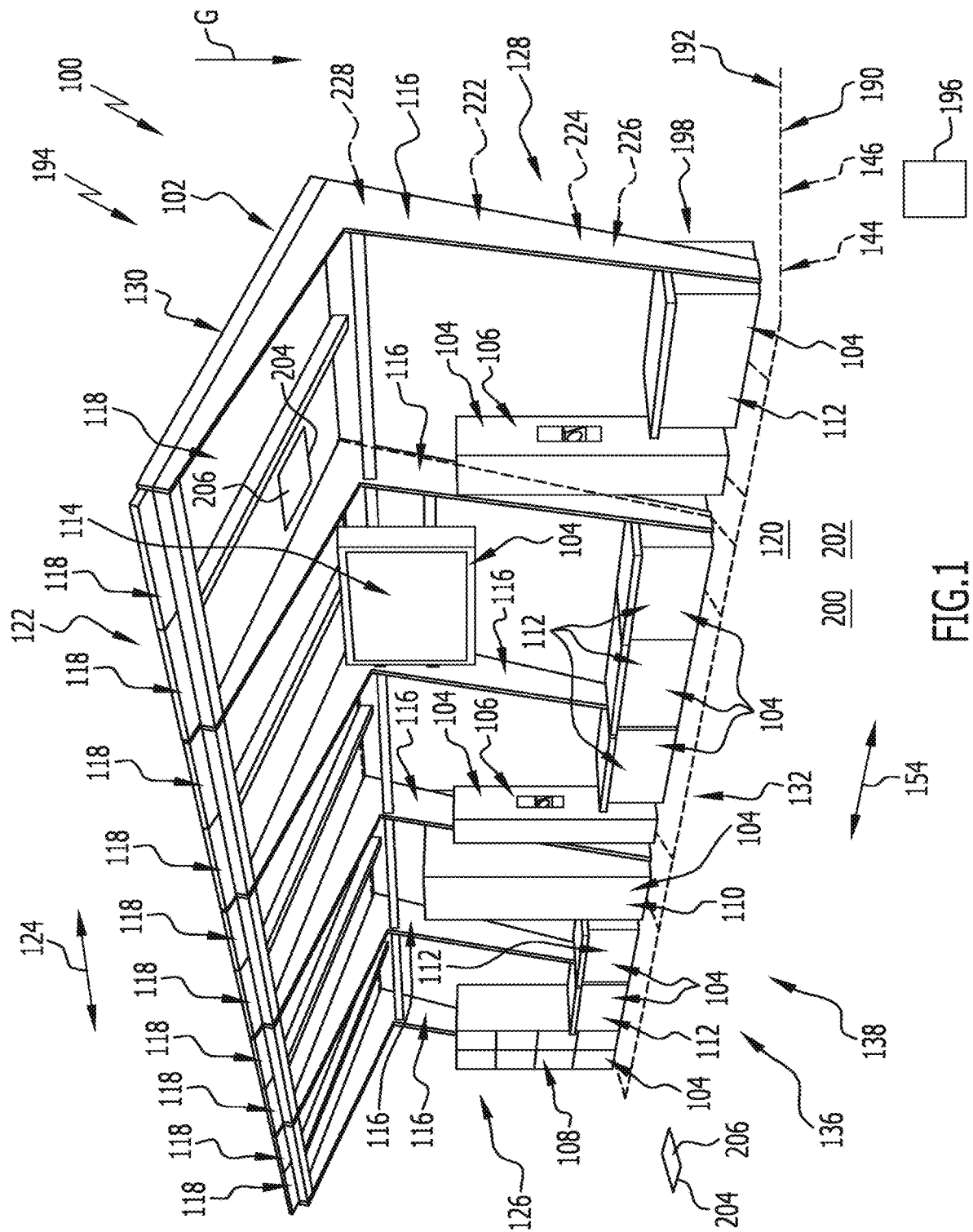
FIG. 1 is a schematic perspective illustration of an embodiment of an infrastructure device.

FIG. 1 shows an infrastructure device designated as a whole by 100.

Figure 2:
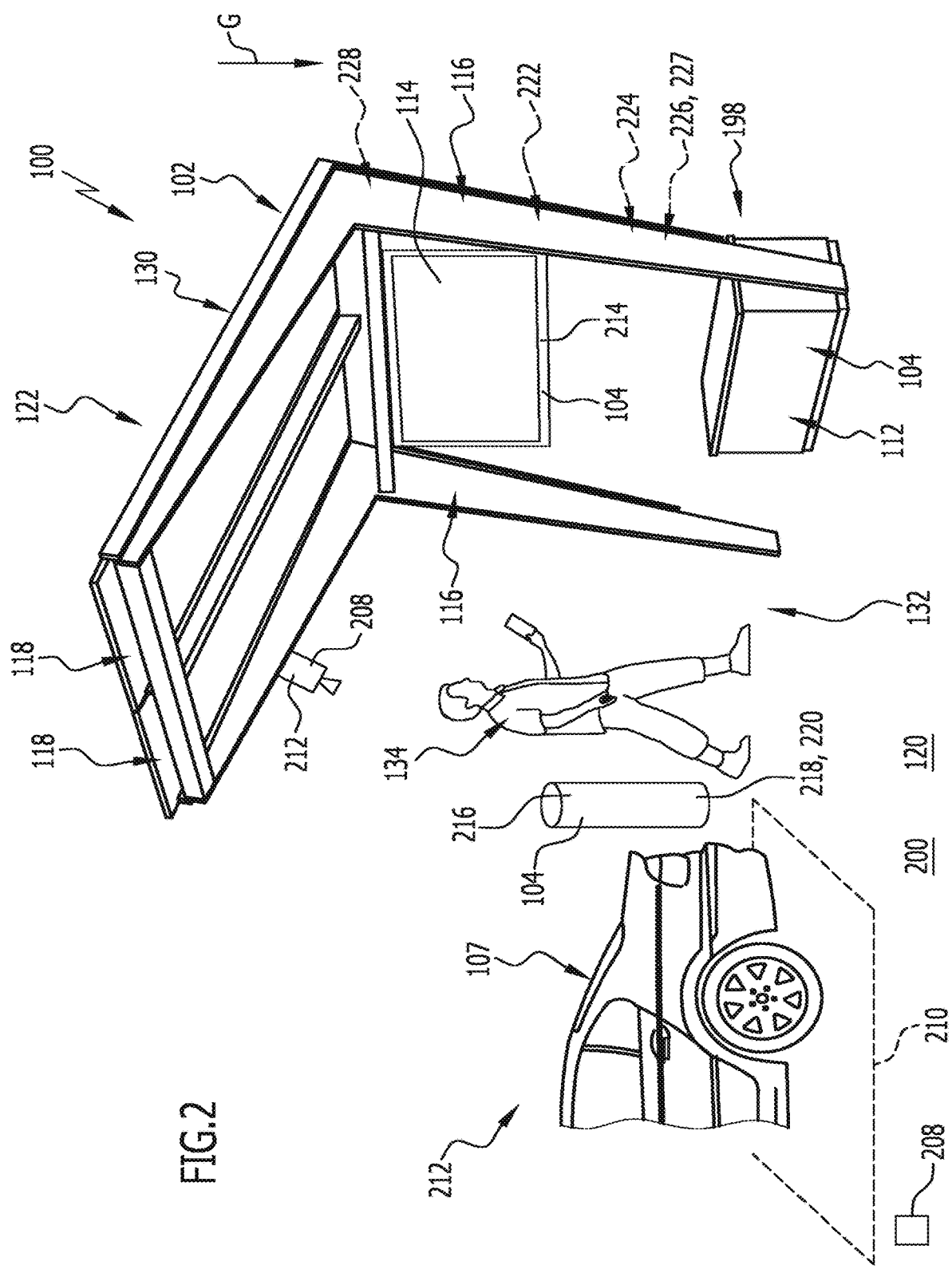
FIG. 2 is a schematic perspective illustration of a further embodiment of an infrastructure device.

The infrastructure device 100 preferably comprises one or more base units 102 and one or more infrastructure units 104, in particular one or more electric charging columns 106 for charging electric vehicles 107 (cf. FIG. 2).

Infrastructure units 104 of the infrastructure device 100 shown in FIG. 1 can, for example, also be designed as a locker device 108, as a vending machine 110, as a bench device 112 and/or as a screen 114.

The base unit 102 comprises two or more than two support elements 116 which support one or more roof elements 118.

The support elements 116 and the roof elements 118 are preferably arranged and designed in such a way that the roof elements 118 are arranged at a distance from a floor 120.

The roof elements 118 of the base unit 102 preferably form a roof 122 of the base unit 102.

The roof elements 118 are preferably arranged obliquely to the direction of gravitational force G.

In particular, the roof 122 is a roof 122 of the base unit 102 which is arranged obliquely to the direction of gravitational force G.

A main plane of extension of the roof elements 118 preferably runs inclined and/or obliquely in relation to a horizontal direction 124, which is in particular a direction perpendicular to the direction of gravitational force G.

The roof elements 118 of the base unit 102 shown in FIG. 1 and/or the roof 122 formed by the roof elements 118 preferably have a slope from a front side 126 of the base unit 102 to a rear side 128 of the base unit 102.

On the front side 126, roof elements 118, parallel to the direction of gravitational force G, are preferably at a distance from the floor 120 which is greater than a distance between the roof elements 118 and the floor 120 on the rear side 128 facing away from the front side 126.

Consequently, a rear side 128 of the base unit 102 is preferably understood to be a side of the base unit 102 on which the roof elements 118 are at a distance from the floor 120, parallel to the direction of gravitational force, which is less than a distance between the roof elements 118 and the floor 120 on the front side 128 facing away from the back side 126.

The roof elements 118 and/or the roof 122 preferably encompass and/or form an in particular circumferential edge region 130.

A projection of the edge region 130 of the roof elements 118 parallel to the direction of gravitational force G onto a plane arranged perpendicular to the direction of gravitational force G preferably forms an occupied area 132 for people 134 (cf. FIG. 2).

People 134 and/or users can preferably be protected by the base unit 102 in the occupied area 132 from the effects of the weather, in particular from precipitation and/or from sunlight.

The infrastructure device 100 preferably comprises a foundation 136 and/or a floor plate 138.

The foundation 136 and/or the floor plate 138 are only indicated by arrows in the figures.

The foundation 136 and/or the floor plate 138 serve in particular to anchor the support elements 116 of the base unit 102.

The support elements 116 of the base unit 102 are therefore preferably anchored to the foundation 136 and/or to the floor plate 138.

The infrastructure device 100 can preferably comprise a plurality of photovoltaic elements 140, which are formed in particular by roof elements 118 of the base unit 102.

As an alternative or in addition to this, it is possible for the infrastructure device 100 to include photovoltaic elements 140 which are arranged on the roof elements 118 of the base unit 102.

It may be favorable if the infrastructure device 100 comprises a collision protection device 142, by means of which one or more infrastructure units 104, in particular the electric charging columns 106, are protected from a collision with a vehicle.

The collision protection device 142 preferably at least partially surrounds the infrastructure units 104 to be protected, in particular at a distance of at least approximately 10 cm and/or at most approximately 100 cm.

It may be favorable if the collision protection device 142 surrounds the infrastructure units 104 to be protected at a distance in the range of approximately 10 cm to approximately 100 cm.

It is conceivable, for example, that the collision protection device 142 comprises a curb delimitation 144, only indicated in the figures, which surrounds the infrastructure units 104 to be protected.

As an alternative or in addition to a curb 144, it may be provided that the collision protection device 142 comprises one or more metal bracket elements 146 which surround the infrastructure units 104 to be protected.

Figure 25:
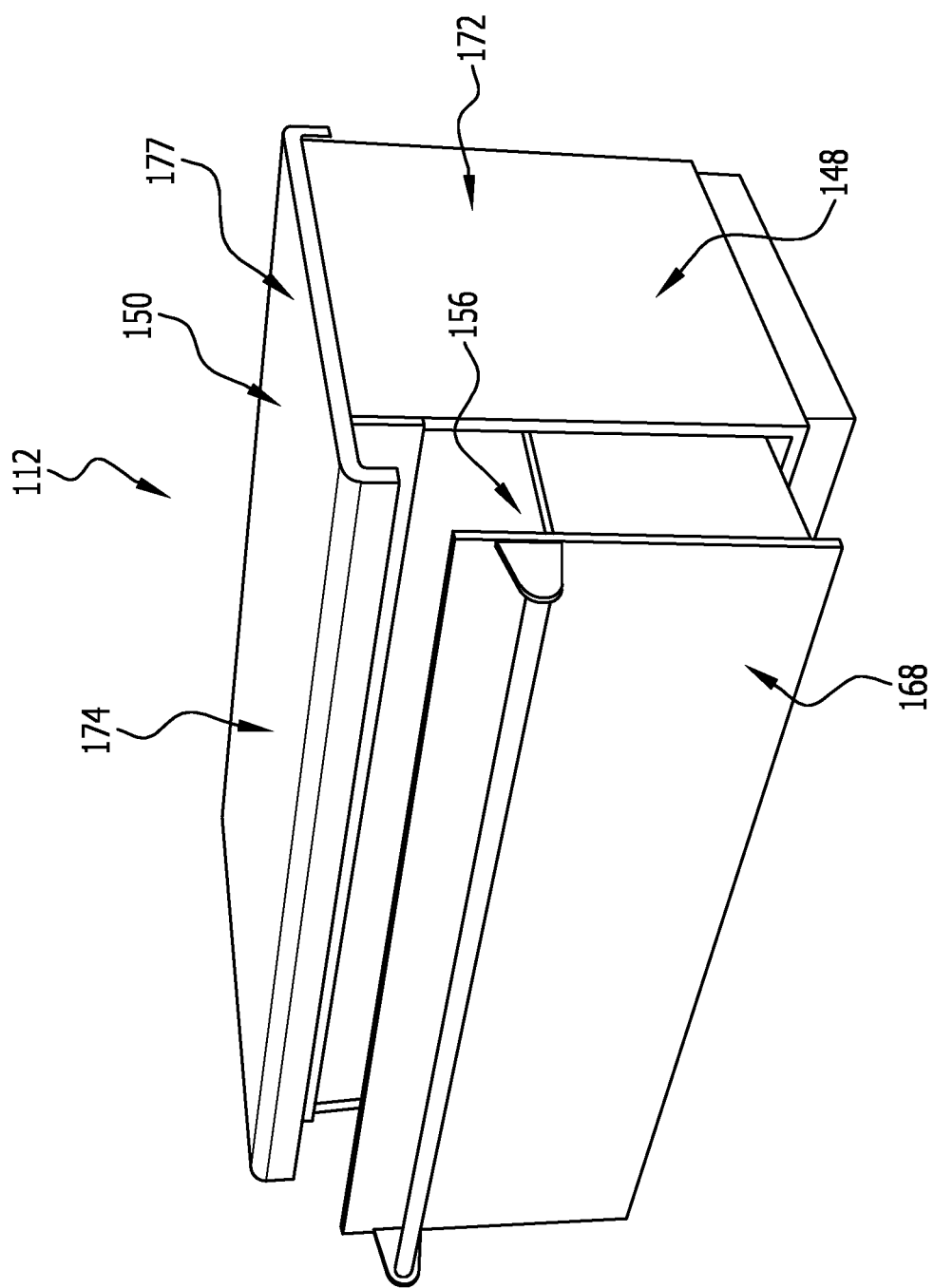
FIG. 25 is a schematic perspective illustration of a bench device for an infrastructure device.
Figure 26:
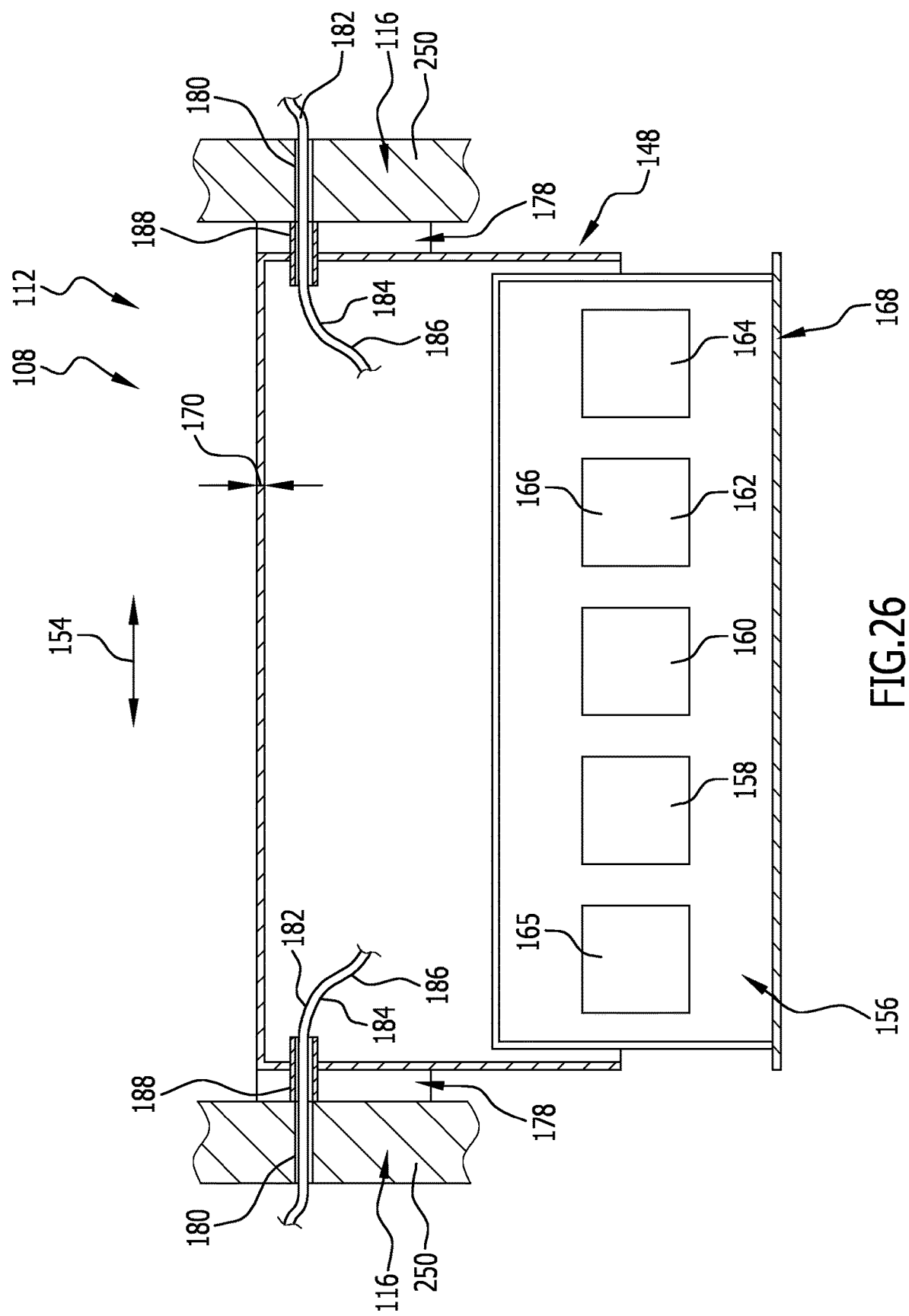
FIG. 26 is a schematic section through a housing device of the bench device from FIG. 25, wherein the housing device is arranged between two support elements of a base unit.
Figure 27:
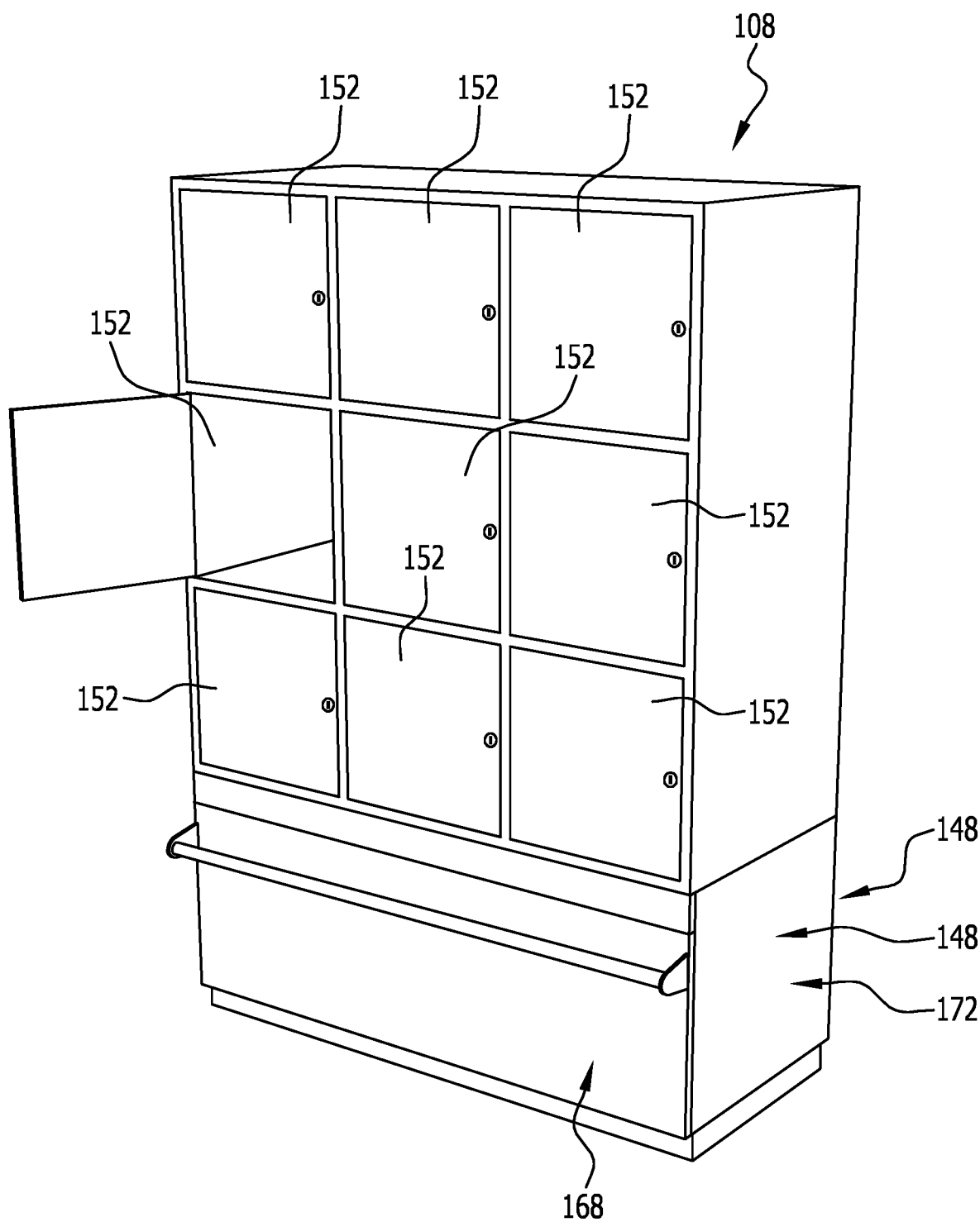
FIG. 27 is a schematic perspective illustration of a locker device for an infrastructure device.

In the infrastructure device 100 shown in FIG. 1, the locker device 108 and the bench device 112 preferably each include a housing device 148 (cf. FIGS. 25 to 27).

The bench device 112 preferably comprises one or more seats 150 each, wherein the locker device 108 preferably includes a plurality of lockers 152.

The infrastructure device 100 preferably comprises a plurality of bench devices 112 and/or a plurality of locker devices 108, wherein the housing device 148 of the bench device 112 and/or the locker device 108 form a collision protection device 142 for the electric charging columns 106.

In particular, it can be provided that several electric charging columns 106 of the infrastructure device 100 are arranged along a transverse direction 154, wherein the housing devices 148 of the bench device 112 and/or the locker device 108 have a greater width than the electric charging columns 106 perpendicular to the transverse direction 154.

It may be favorable if a distance between two housing devices 148 of the bench device 112 and/or the locker device 108 in the transverse direction 154 corresponds to at most approximately twice the width, in particular at most approximately 1.5 times the width, of an electric charging column 106 in the transverse direction 154.

Thus, by arranging the housing devices 148 of the bench devices 112 and/or the locker device 108 adjacent to the electric charging columns 106 of the infrastructure device 100, a collision protection device 142 for the electric charging columns 106 can be formed.

The housing devices 148 of the bench device 112 and/or the locker device 108 preferably comprise a receptacle 156 for receiving one or more control devices 158 and/or for receiving one or more inverter devices 160 and/or for receiving one or more energy storage devices 162 and/or for receiving one or more communication devices 164 and/or for receiving power electronics 165 of an infrastructure unit 104 for charging electric vehicles 107. (cf. FIG. 26).

The energy storage device 162 can for example comprise a battery 166 or be formed by this.

It may be favorable if the communication device 164 is designed for communication in radio networks and/or mobile radio networks and/or wired networks.

By arranging power electronics 165 of an infrastructure device 104, at least part of an electric charging column 106 can preferably be arranged in the housing device 148 of the bench devices 112 and/or the locker device 108.

The receptacle 156 of the housing device 148 of the bench device 112 and/or the locker device 108 is preferably designed as a drawer 168.

It may be favorable if the housing device 148 is formed from a comparatively stable material with a material thickness 170 of at least approximately 1 cm.

As an alternative or in addition to this, it is conceivable that the housing device 148 comprises a seamed sheet metal material, which in particular forms a stable frame of the housing device 148.

Preferably, the housing devices 148 of the bench device 112 and/or the locker device 108 can be particularly stable.

The housing device 148 of the bench device 112 and/or the locker device 108 may preferably be anchored in the floor 120, in particular in the foundation 136 and/or in the floor plate 138, for example by means of one or more fastening elements.

It may be favorable, for example, if the housing device 148 of the bench device 112 can be anchored in a floor 120 by means of a threaded rod and/or one or more screws.

Electrical energy can preferably be stored by means of the energy storage device 162, in particular by means of the battery 166, for example electrical energy generated by the photovoltaic elements 140 of the infrastructure device 100.

The housing device 140 of the bench device 112 and/or the locker device 108 preferably comprises a thermal insulation device 172.

Control devices 158 and/or inverter devices 160 and/or energy storage devices 162 and/or communication devices 164 arranged in housing device 148 may preferably be protected from temperature fluctuations, in particular from extremely high temperatures (more than 25° C.) and/or from extremely low temperatures (less than −10° C.), by means of the thermal insulation device 172.

The bench device 112 preferably comprises a bench temperature control device 174 for controlling the temperature of the seats 150 of the bench device 112.

The bench temperature control device 174 is, in particular, a seat heating device 176 for heating the seats 150.

It may be favorable if the seat heating device 176 can be activated by means of a detection device 177 for detecting seat occupancy of the seats 150 of the bench seat device 112, in particular for a predetermined period of time.

The detection device 177 may preferably be integrated into the bench seat device 112.

As can be clearly seen in FIG. 26, the housing device 148 of the bench device 112 is arranged between support elements 116 of the base unit 102.

The infrastructure device 100 preferably comprises a connecting device 178 by means of which the housing device 148 of the bench device 112 is connected to the support elements 116 in such a way that forces acting on the support elements 116 in the transverse direction 154 can be absorbed by the housing device 148 of the bench device 112.

As can also be clearly seen in FIG. 26, the support elements 116 and/or supporting elements 250 of the support elements 116 can each include a feedthrough opening 180 through which a cable 182, for example an electrical connection cable 184 and/or a data cable 186, can be passed.

The connecting device 178 preferably comprises sleeves 188 arranged between the housing device 148 and a respective support element 116.

It may be favorable if the cable 182 can also be passed through the sleeves 188.

For this purpose, the sleeves 188 are preferably arranged coaxially with the feedthrough openings 180.

Connection cables 184 and/or data cables 186 may preferably be fed to a respective cable routing 224 in a support element 116 by means of the sleeves 188.

Preferably, cables 182, in particular electrical connection cables 184 and/or data cables 186, can thus be routed in a vandalism-proof and/or aesthetically pleasing manner.

The base unit 102 can preferably be stiffened and/or stabilized by housing devices 148 of one or more bench devices 112 and/or one or more locker devices 108.

It may be particularly beneficial if people 134 and/or users can sit on the seats 150 of the bench device 112, for example during a charging process, wherein the housing devices 148 of the bench device 112 simultaneously are able to create an option to accommodate control devices 158 and/or inverter devices 160 and/or to accommodate energy storage devices 162 and/or communication devices of the infrastructure device 100 in a vandalism-proof manner in the receptacle 156.

It has proven to be advantageous if one or more, in particular all, infrastructure units 104 are arranged within a projection of the edge region 130 of the roof elements 118 of the base unit 102 parallel to the direction of gravitational force G on a plane arranged perpendicular to the direction of gravitational force G.

In this case, all infrastructure units 104 are preferably accessible to people 134 and/or users and at the same time protected from the effects of the weather, in particular from precipitation and/or sunlight.

The infrastructure device 100 can preferably comprise a plurality of curbs 190 which preferably at least partially surround the foundation 136 and/or the floor plate 138.

The infrastructure device 100 preferably further comprises a floor edge lighting 192 which runs at least partially along the curbs 190 and/or an edge of the floor plate 138.

It may be favorable if a plurality of infrastructure facilities 100 are arranged in a staggered manner next to one another and in particular form an infrastructure system 194 which comprises a plurality of infrastructure facilities.

The infrastructure system 194 preferably comprises a higher-level control system 196 by means of which a plurality of infrastructure devices 100 can be controlled, in particular among one another.

The support elements 116 of the base unit 102 shown in FIG. 1 form, in particular, a separating region 198 which is not passable by a vehicle 107.

The separating region 198 preferably adjoins a driving region which is passable by a vehicle 107 and/or an occupied area 202 for people 134.

The infrastructure device 100 preferably comprises a plurality of charging cable provision devices 204, which are each preferably designed to provide a charging cable of an infrastructure unit 104.

It may be beneficial if a charging cable can be provided in each case by means of an in particular electrically operated charging cable provision device 204 at a charging position of the infrastructure device 100 for charging an electric vehicle 107, in particular in an automated manner and/or on request by a person 134 and/or a user.

The charging cable provision device 204 preferably comprises one or more, in particular electrically operated or operable, charging cable resetting devices, by means of which a charging cable can be moved back from a charging position to a storage position.

The infrastructure device 100 preferably comprises one or more charging cable receptacle spaces 206.

It may be favorable if charging cables from infrastructure units 104 can be received in the charging cable receptacle spaces 206.

It can be particularly favorable if charging cables from infrastructure units 104 can each be moved back into a charging cable receptacle space 206 by means of a charging cable resetting device.

The charging cable receptacle space 206 can be arranged, for example, in the foundation 136 and/or in the floor plate 138 of the infrastructure device 100.

As an alternative or in addition to this, it is conceivable that the charging cable receptacle space 206 is arranged on the roof 122.

The embodiment of the infrastructure device 100 shown in FIG. 2 preferably comprises a sensor device 208 for detecting an occupancy of a charging station 210 and/or a charging region 211.

The sensor device 208 can include, for example, one or more sensors arranged in the floor 120 and/or one or more optical sensors, for example a camera 212, to detect occupancy.

The infrastructure device 100 shown in FIG. 2 preferably comprises an infrastructure unit 104, which comprises a charging control unit 214, which is formed in particular by the screen 114.

The infrastructure unit 104 preferably further comprises a charging cable unit 216 which is arranged at a distance from the charging control unit 214.

The charging cable unit 216 preferably comprises a charging plug for charging an electric vehicle 107.

It may be favorable if the charging of the electric vehicle 107 can be controlled by means of the charging control unit 214.

The charging cable unit 216 preferably comprises a delimiting element 218, for example a bollard 220.

If a plurality of infrastructure units 104 are provided, each of which includes a charging control unit 214 and a delimitation element 218, it has proven to be advantageous if a plurality of delimitation elements 218 delimit an occupied area 132 for people 134.

A plurality of further infrastructure units 104, which are designed in particular as sales stations, for example as vending machines 110, are preferably arranged in the occupied area 132.

It has proven to be favorable if the delimiting elements 218 are also arranged within a projection of the edge region 130 parallel to the direction of gravitational force G onto a plane arranged perpendicular to the direction of gravitational force G.

A protected occupied area 132 for people 134 when charging electric vehicles 107 may thus preferably be provided by means of the roof elements 118 of the base unit 102, wherein electric vehicles 107, which already have a roof, can be arranged at least partially outside the projection of the edge region 130.

In the case of the infrastructure device 100 shown in FIG. 2, it is provided that the charging control unit 214 are arranged in the region of the roof 122 formed by the roof elements 118.

The charging control unit 214 is in particular fixed to a bearing structure of the base unit 102 in the region of the roof elements 118.

The base units 102 shown in FIGS. 1 to 5 preferably each include a water drainage 222.

By means of the water drainage 222, liquid, in particular water, which hits the roof elements 118 of the base unit 102 and/or a roof 122 formed by the roof elements 118 of the base unit 102, can for example be discharged as rain or snow, for example to a sewer system, in the event of precipitation.

The base units 102 shown in FIGS. 1 to 5 preferably also include a cable routing 224 by means of which electrical power cables and/or data cables can preferably be routed.

The base units 102 preferably further comprise a lighting region 226.

It may be favorable if the base units 102 illustrated in FIGS. 1 to 5 comprise a lighting device 227 for lighting the lighting region 226.

The lighting device 227 preferably comprises one or more lighting elements.

Figure 3:
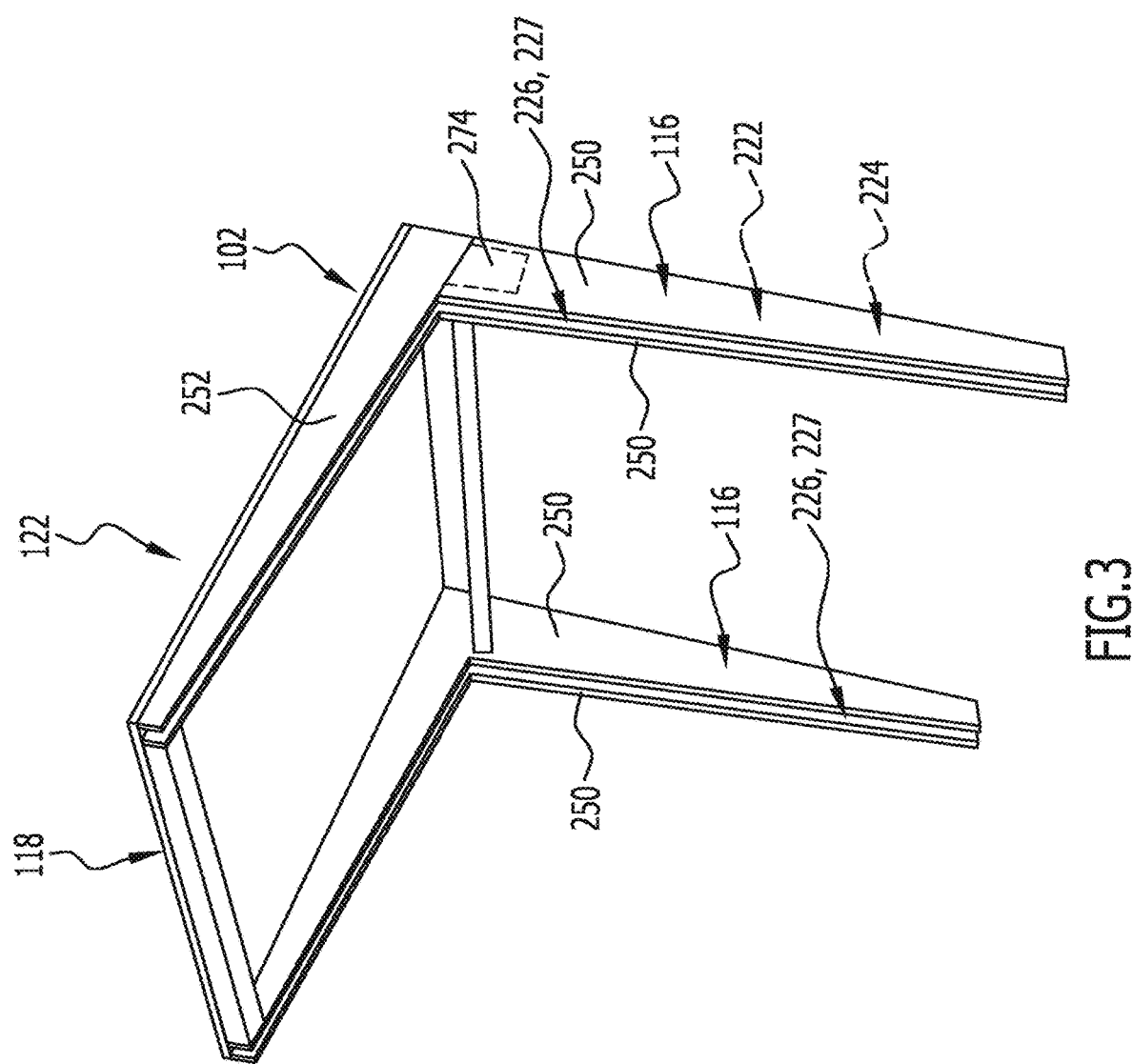
FIG. 3 is a schematic perspective illustration of an embodiment of a base unit for an infrastructure device.
Figure 4:
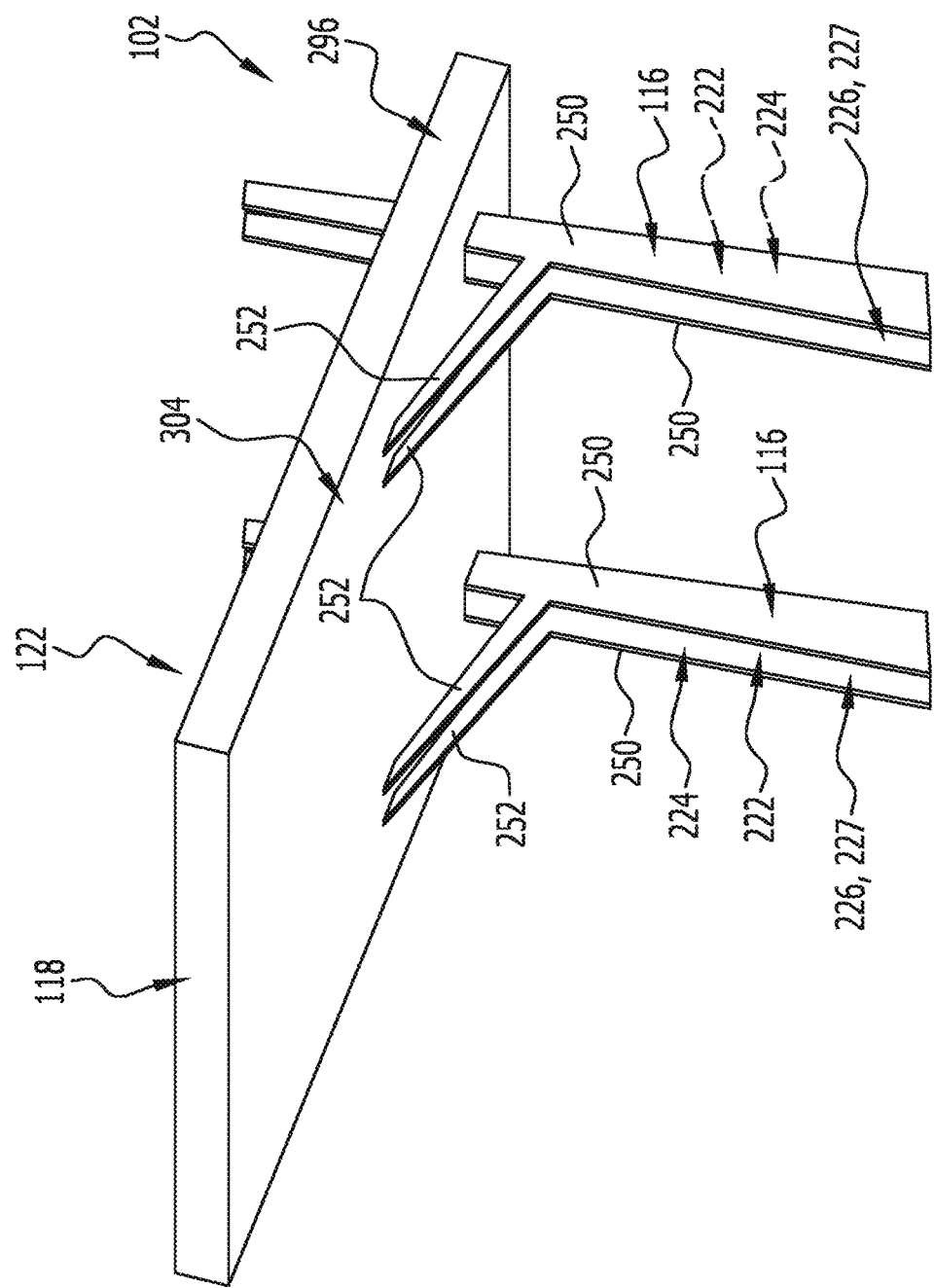
FIG. 4 is a schematic perspective illustration of a further embodiment of a base unit for an infrastructure device.
Figure 5:
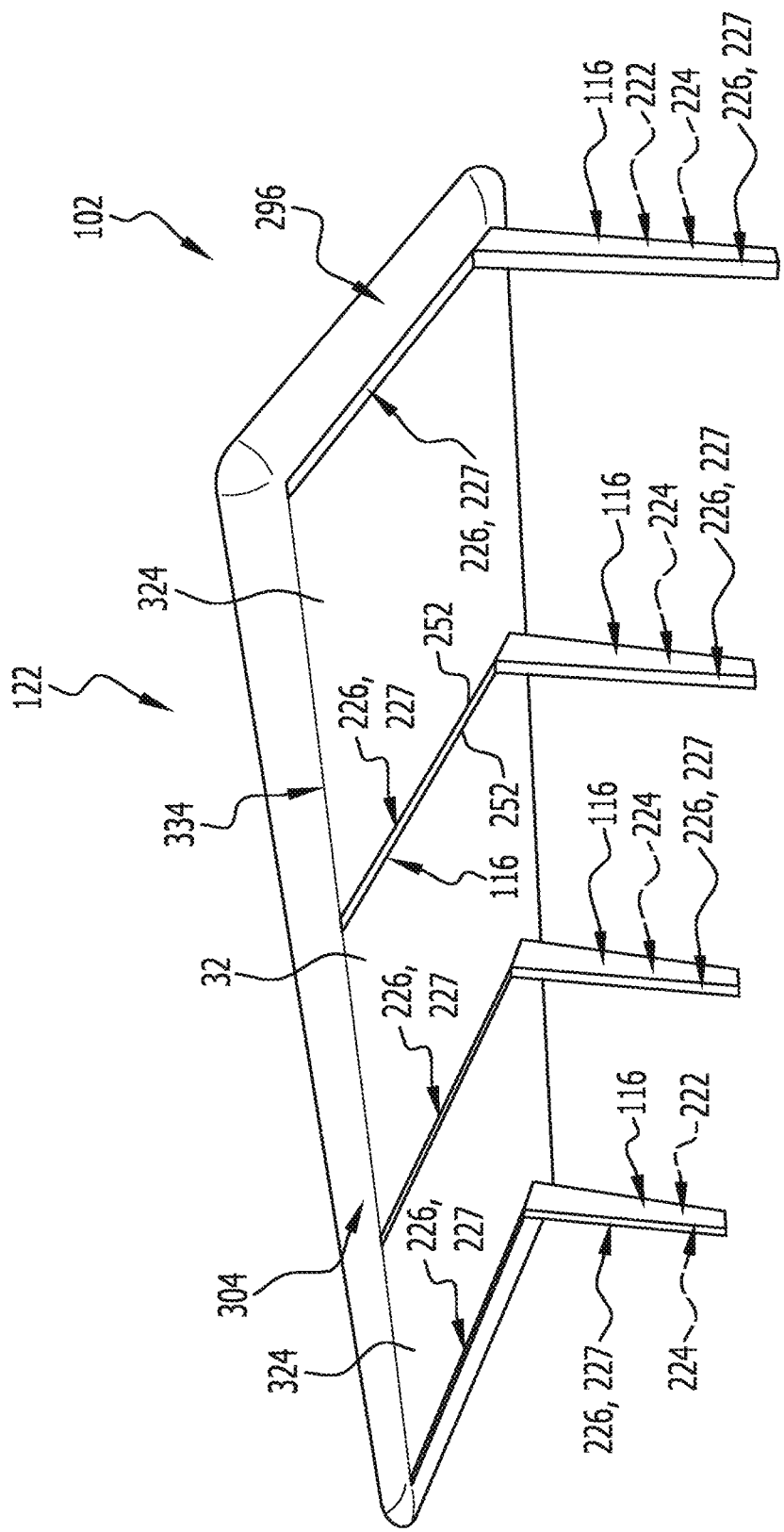
FIG. 5 is a schematic perspective illustration of a further embodiment of a base unit for an infrastructure device.

The water drainage 222 and/or the cable routing 224 and/or the lighting region 226 are preferably arranged at least in portions in one or more support elements 116 (cf. FIGS. 3 to 5).

As an alternative or in addition to this, it is possible that the water drainage 222 and/or the cable routing 224 and/or the lighting region 226 are arranged at least in portions on one or more support elements 116.

In the case of the base units 102 shown in FIGS. 1 and 2, it can be provided that the base unit 102 comprises one or more elongated profile elements 228 which are and/or can be arranged on the support elements along a main direction of extension of the support elements 116.

Figure 12:
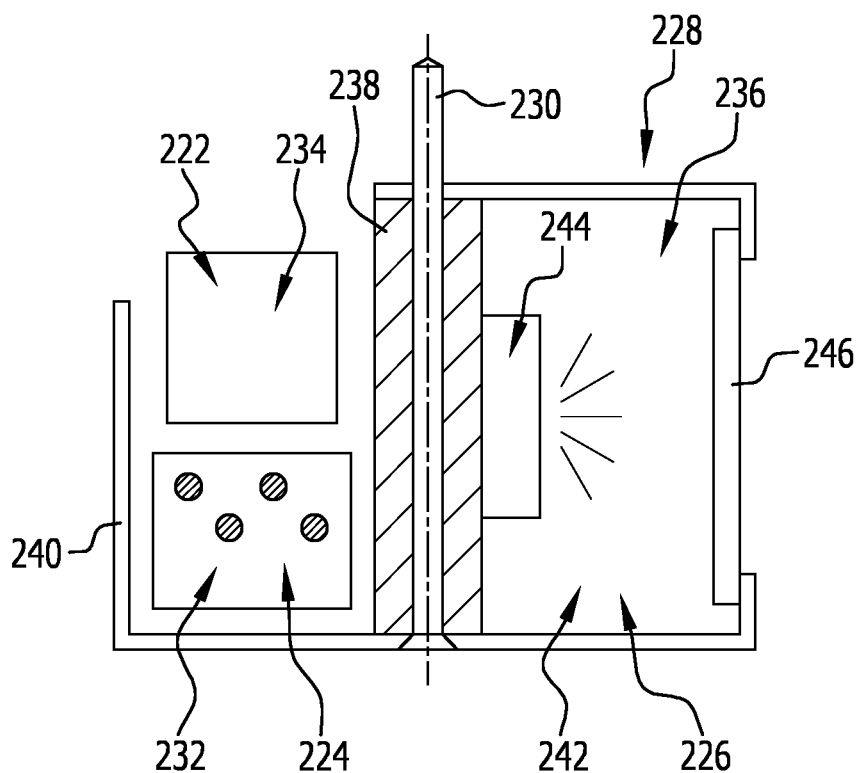
FIG. 12 is a schematic section through an elongated lighting element arranged in an elongated profile element.
Figure 13:
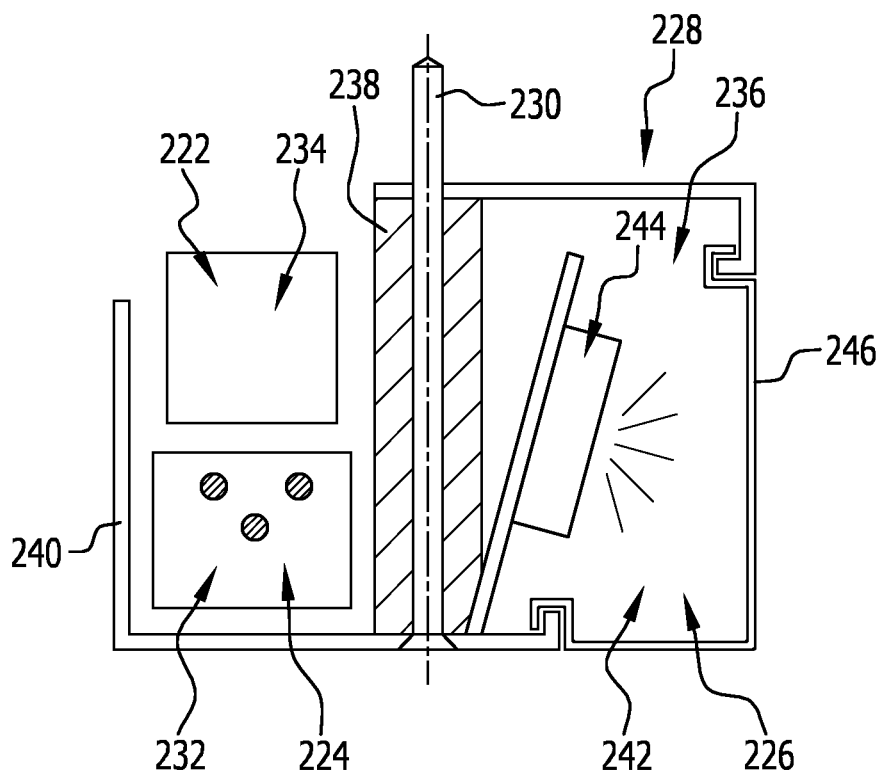
FIG. 13 is a schematic section through a further elongated lighting element arranged in an elongated profile element.
Figure 14:
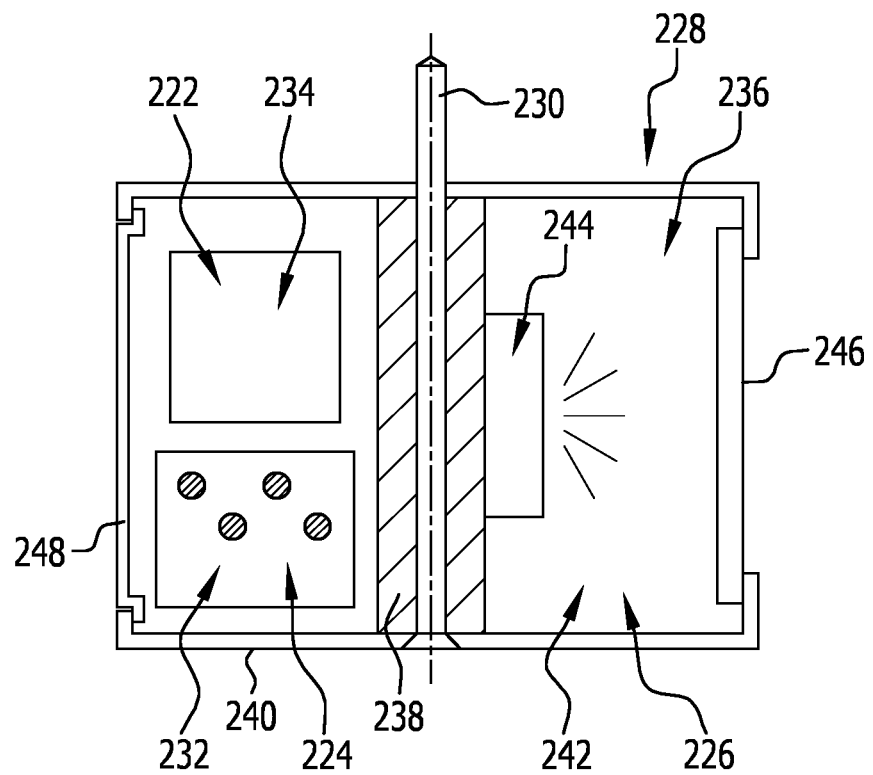
FIG. 14 is a schematic section through a further elongated lighting element arranged in a further elongated profile element.

In FIGS. 12 to 14, different embodiments of the elongated profile elements 228 are shown.

The elongated profile elements 228 can preferably each be fixed to the support elements 116 by means of a fastening element 230.

Each of the elongated profile elements 228 illustrated in FIGS. 12 to 14 preferably comprises a cable routing portion 232 of the cable routing 224 and/or a water drainage portion 234 of the water drainage 222.

The elongated profile elements 228 preferably further comprise a lighting portion 236 of the lighting region 226.

The lighting portion 236 preferably completely covers the cable routing portion 232 and/or the water drainage portion 234.

It may be favorable here if the lighting region 236 is separated from the cable routing portion 232 and/or the water drainage portion 234 by means of an opaque wall element 238.

In this case, the elongated profile elements 228 preferably comprise a metal profile element 240 or are formed by this.

The elongated profile elements 228 preferably include a lighting space 242 in which one or more elongated lighting elements 244, for example LED strips, are arranged.

The elongated profile elements 228 preferably further comprise translucent cover elements 246 for covering the lighting space 242.

In the embodiment of the elongated profile element 228 shown in FIG. 12, the translucent cover element 246 is glued to the metal profile element 240, for example.

In the embodiment of the elongated profile element 228 shown in FIG. 13, the translucent cover element 246 is preferably clipped to the metal profile element 240, in particular on a corner region of the metal profile element 240.

It may therefore be favorable if the elongated lighting element 244 is arranged inclined towards the translucent cover element 246.

The elongated profile element 228 shown in FIG. 14 corresponds substantially to the elongated profile element 228 shown in FIG. 12.

However, the elongated profile element 228 shown in FIG. 14 preferably comprises a locking element 248 which can be arranged, for example, on a support element 116 of the base unit 102.

It may be favorable if the metal profile element 240 of the elongated profile element 228 can be locked to the locking element 248 for the arrangement of the elongated profile element 228 on a support element 116.

Figure 28:
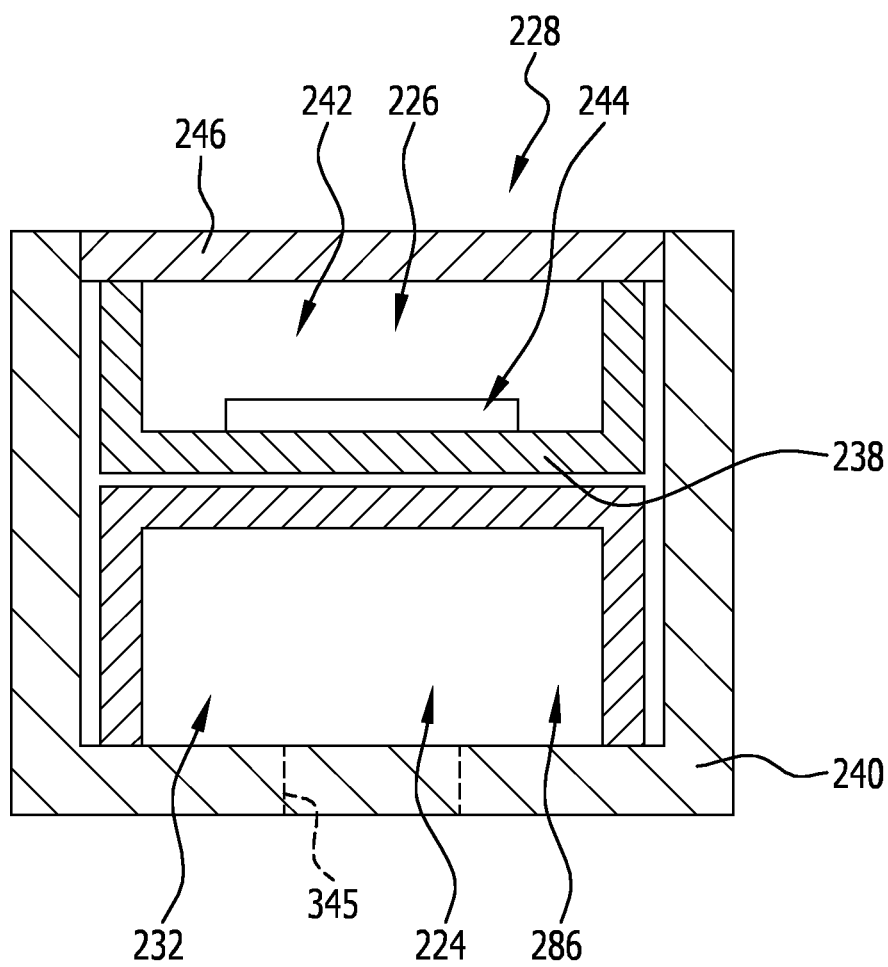
FIG. 28 is a schematic portion through a further elongated lighting element arranged in an elongated profile element.

A further embodiment of an elongated profile element 228 is shown in FIG. 28.

The elongated profile element 228 preferably comprises a metal profile element 240 with a U-shaped cross-section open on one side.

The embodiment of the elongated profile element 228 shown in FIG. 28 preferably comprises two separating profile elements 249, which likewise have a U-shaped cross-section. Alternatively, it is conceivable that the elongated profile element 228 comprises only a single separating profile element 249, which has an H-shaped cross-section.

The separating profile elements 249 preferably form a lighting space wall element 238 which separates the lighting space 242 from a cable routing space 286.

By providing the two separating profile elements 249 having a U-shaped cross-section and/or by providing a single separating profile element 249 having an H-shaped cross-section, a particularly stable separation of the lighting space 242 and the cable routing space 286 can preferably be made possible, wherein a stable support for the translucent cover element can also preferably be provided.

The support elements 116 of the base units 102 shown in FIGS. 3 and 4 preferably comprise two at least approximately flat supporting elements 250 which are or can be connected to one another.

The supporting elements 250 are preferably arranged at least approximately parallel to one another.

It may be favorable if at least edges of the supporting elements 250 are arranged in a common plane.

Each support element preferably comprises two supporting elements 250.

The base unit 102 shown in FIG. 4 preferably additionally comprises a plurality of roof supporting elements 252, wherein one or more roof elements 118 each are supported by means of one or more roof supporting elements 252.

Preferably, one or more roof elements 118 are each fixed to one or more roof supporting elements 252.

In particular, it may be advantageous if a roof supporting element 252 is connected to a supporting element 250 of a support element, in particular is fixed to the supporting element 250 of the support element.

It is conceivable, for example, that the roof supporting elements 252 are connected in an integral or bonded manner to a support element 116 and/or to a supporting element 250 of a support element 116, for example welded thereto.

As an alternative or in addition to this, it is conceivable that the roof supporting elements 252 are connected in a force-fitting or form-fitting manner to the support elements 116 and/or to supporting elements 250 of a support element 116.

In FIGS. 20 to 23, a plurality of possibilities are preferably shown for connecting roof supporting elements 252 to supporting elements 250 in a force-fitting or form-fitting manner.

Figure 20:
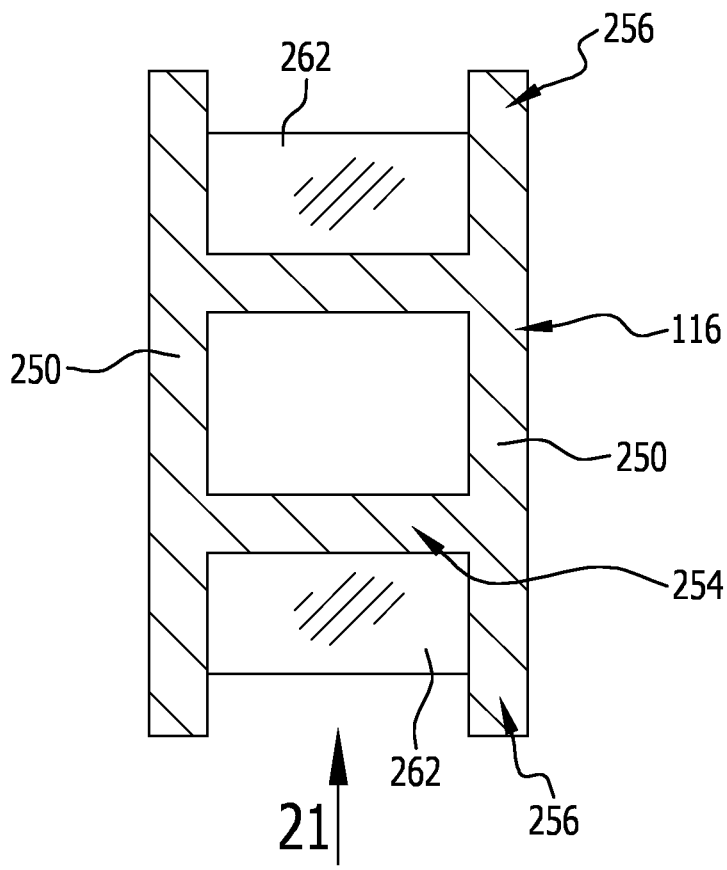
FIG. 20 is a schematic portion through a further support element of a base unit for an infrastructure device.

FIG. 20 shows a cross-section through a support element 116 in a cross-section taken perpendicular to the main direction of extension of the support element 116.

The support element 116 is preferably at least approximately box-shaped.

The support element 116 preferably comprises an annularly closed stiffening portion 254 and supporting element regions 256 arranged on two sides of the annularly closed stiffening portion 254 that are facing away from one another.

Figure 21:
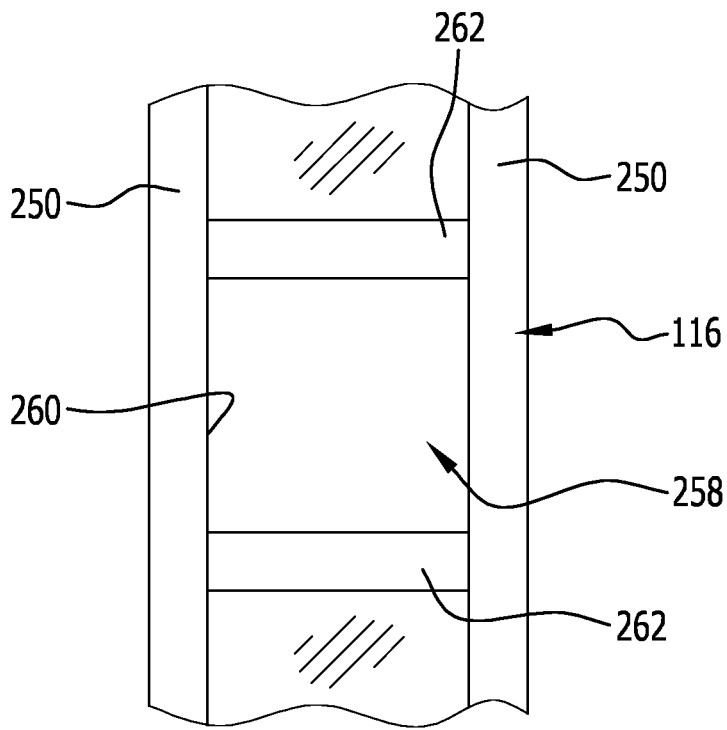
FIG. 21 is a schematic front view of the support element from FIG. 20 when looking in the direction of arrow 21 in FIG. 20.

FIG. 21 shows a front view of the support element 116 from FIG. 20 when looking in the direction of the arrow 21 in FIG. 20.

It can be clearly seen there that an insertion receptacle 258 in the form of a feedthrough opening 260 is introduced into the annularly closed stiffening portion 254.

To reinforce the support element 116, rib elements 262 are arranged above and below the passage opening 260, which, for example, are connected in a bonded manner, for example welded, to the stiffening portion 254 and/or the supporting elements 250.

One or more roof supporting elements 252 for fastening the same to the support element 116 can preferably be inserted into the insertion receptacle 258.

Figure 22:
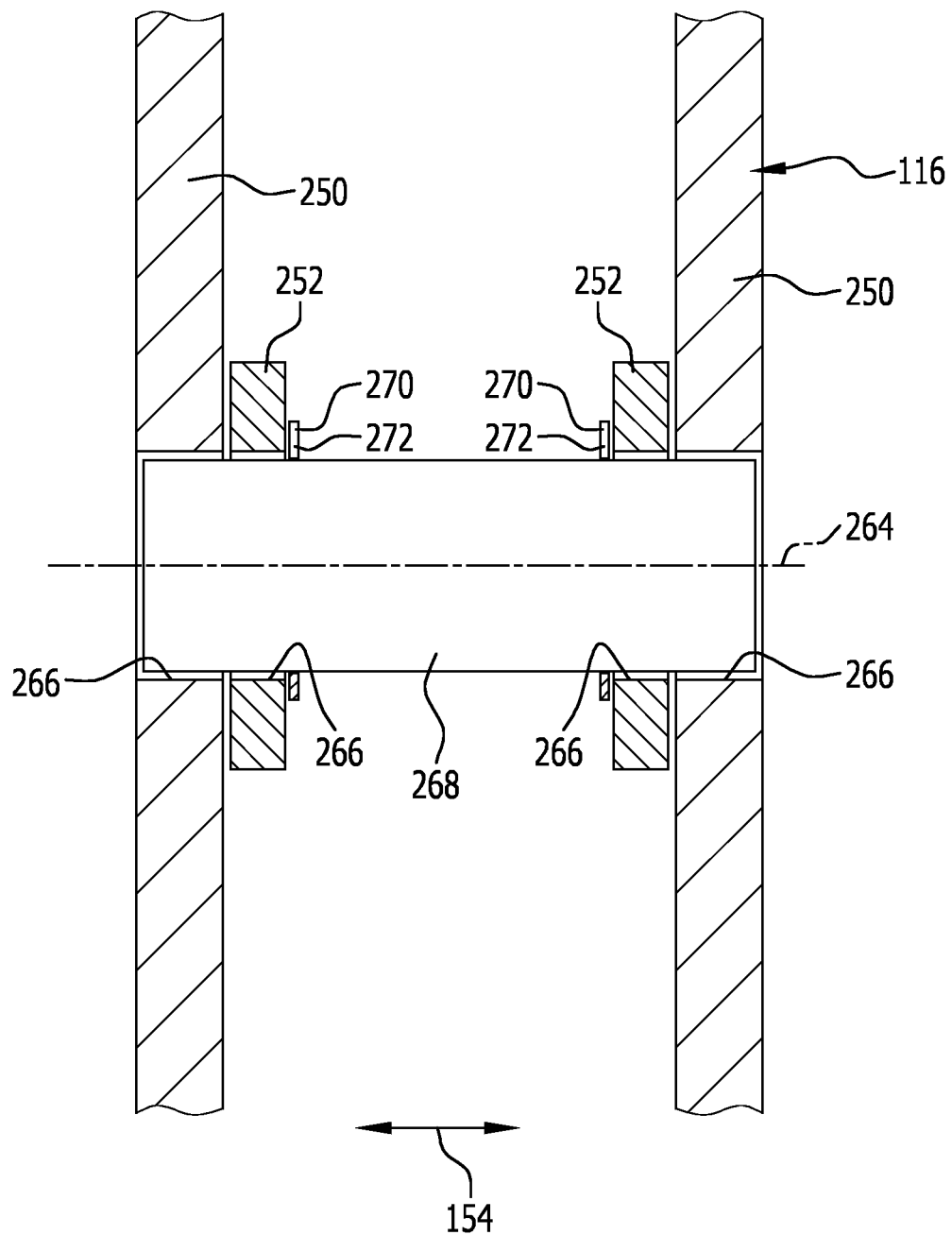
FIG. 22 is a schematic section through a roof supporting element arranged on a support element of a base unit.

FIG. 22 shows a section through two supporting elements 250 of a support element 116 and roof supporting elements 252 arranged between the two supporting elements 250.

The supporting elements 250 and the roof supporting elements 252 preferably each have a receptacle opening 266 arranged coaxially to a longitudinal center axis 264.

To secure the roof supporting elements 252, the base unit 102 preferably comprises a bolt element 268 arranged in the transverse direction 154 for supporting the roof supporting elements 252 against the direction of gravitational force G.

As can be clearly seen in FIG. 22, the bolt element 268 is secured against displacement along the longitudinal center axis 264 or along the transverse direction 154 by means of two securing elements 270, for example by means of two splints 272.

In an embodiment not shown in the figures, it is also conceivable that the bolt element 268 is connected in a bonded manner to a support element 116 and in particular protrudes away from a supporting element 250 of the support element 116.

It may be favorable if the roof supporting elements 252 with a receptacle opening 266 for supporting the roof supporting elements 252 can be attached onto the bolt element 268 counter to the direction of gravitational force G and can then be clamped perpendicular to the direction of gravitational force G by means of the bolt element 268 on the support element 116.

It may be advantageous in particular if the bolt element 268 and/or the roof supporting element 252 comprise a clamping cone so that the roof supporting element 252 can be clamped to the support element 116 by linear displacement of the roof supporting element 252 on the clamping cone, for example by means of a screw element.

A torque support can preferably be provided by providing two or more than two bolt elements 268. In particular, it can be prevented that a roof supporting element 252 can be rotated relative to a supporting element 250 and/or a support element 116 on which the roof supporting element is arranged.

Figure 23:
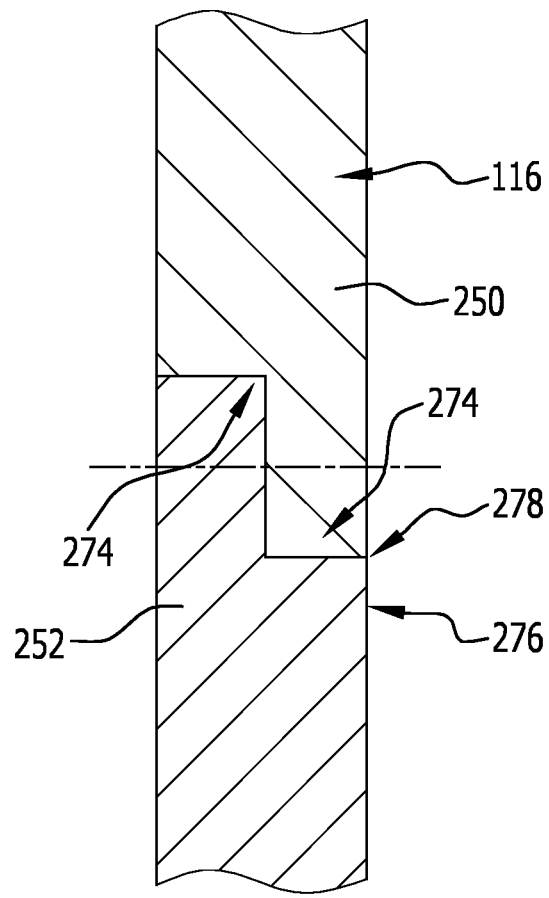
FIG. 23 is a schematic section through a roof supporting element arranged on a support element of a base unit.

FIG. 23 shows a further, particularly simple option for fixing a roof supporting element 252 to a supporting element 250 of a support element 116.

The supporting element 250 and/or the roof supporting element 252 preferably each comprise a notched region 274.

The notched regions 274 of the roof supporting element 252 and of the supporting element 250 are preferably designed to be complementary in such a way that an outer contour 276 of the supporting element 250 and of the roof supporting element 252 continuously merge into one another at a joint region 278.

Preferably, when a supporting element 250 is connected to a roof supporting element 252, as shown in FIG. 23, a particularly visually appealing impression can be created.

An example of such a notched region 274 of a roof supporting element 252 and/or a support element is shown in FIG. 3, for example.

FIGS. 8 to 11 show various possibilities for arranging portions of the cable routing 224, the water drainage 222 and/or the lighting region 226 on and/or in a support element 116.

Figure 8:
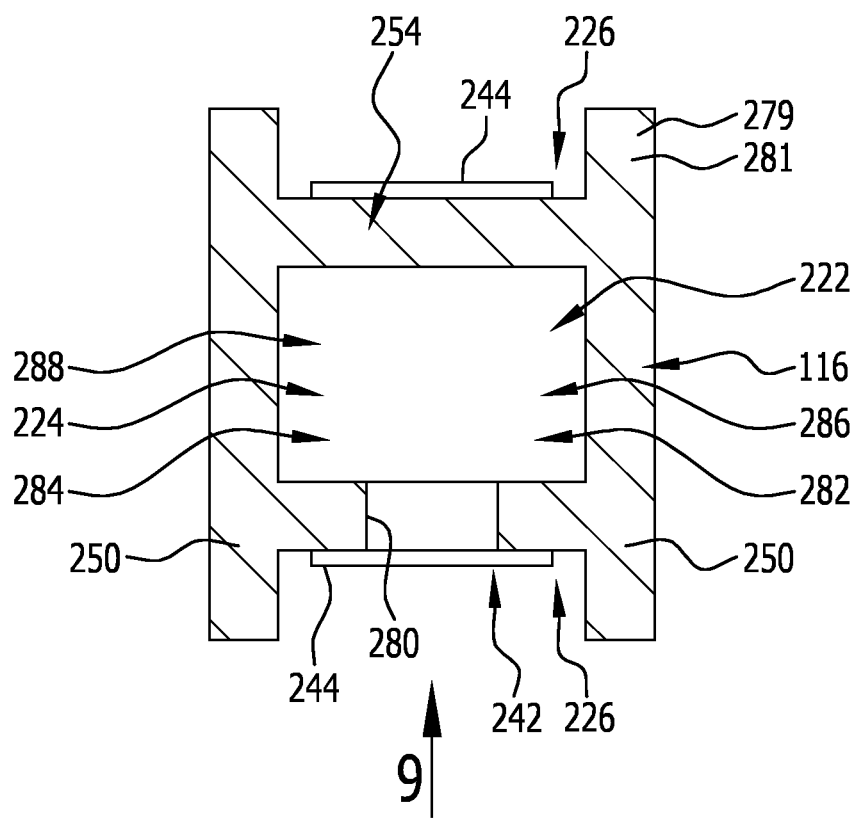
FIG. 8 is a schematic section through a further support element for a base unit for an infrastructure device.
Figure 9:
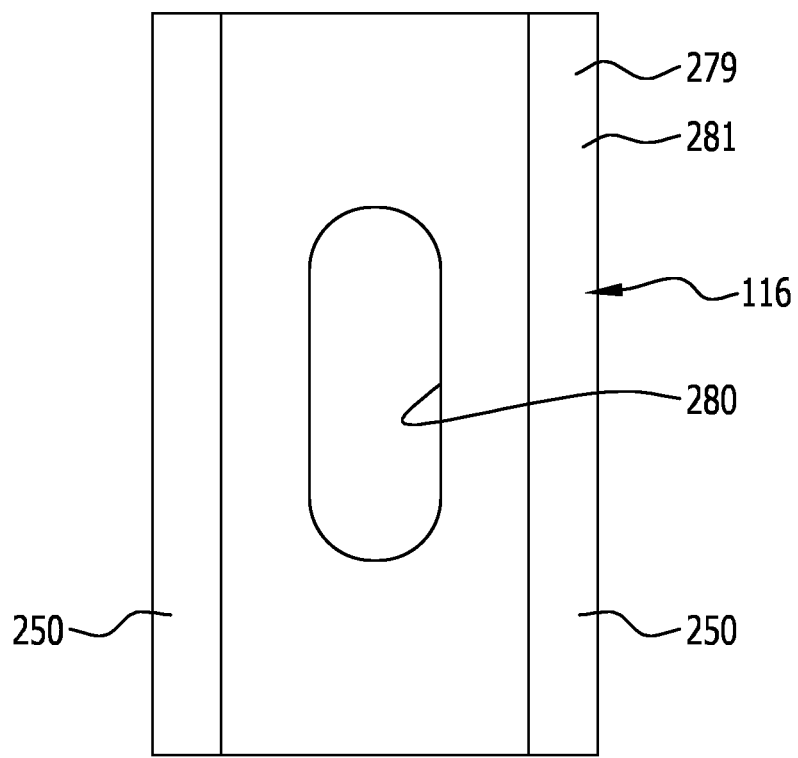
FIG. 9 is a schematic front view of the support element from FIG. 8 when looking in the direction of arrow 9 in FIG. 8.
Figure 10:
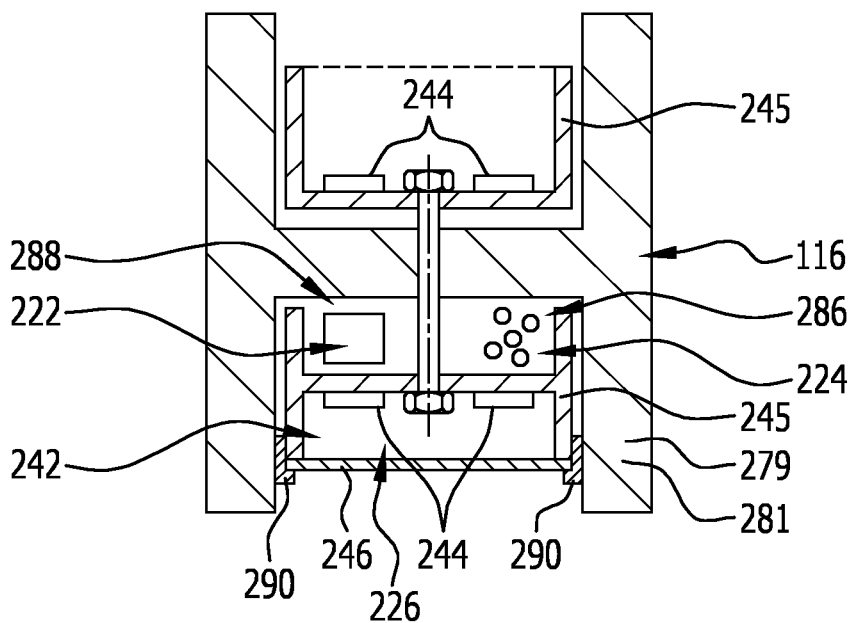
FIG. 10 is a schematic section through a further support element of a base unit for an infrastructure device.
Figure 11:
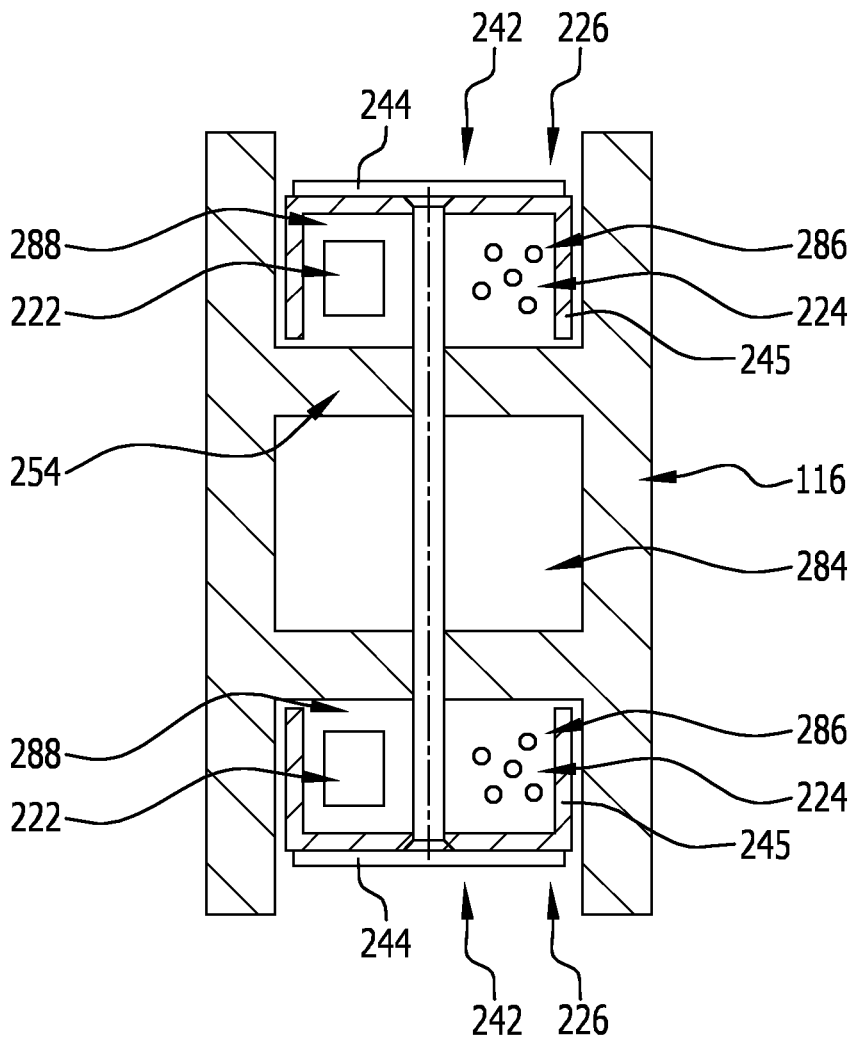
FIG. 11 is a schematic section through a further support element of a base unit for an infrastructure device.

FIGS. 8, 10 and 11 each show a cross-section through the support elements 116, taken perpendicular to a main direction of extension of the support elements 116, wherein FIG. 9 shows a front view of the support element 116 from FIG. 8 looking in the direction of the arrow 9 in FIG. 8.

The support elements 116 shown in FIGS. 8 to 11 preferably comprise one or more profile elements 279, in particular one or more profile steel elements 281, or are formed from these.

The profile steel elements 281 preferably have a material thickness in the range of from approximately 1 cm to approximately 10 cm, in particular in the range of from approximately 1 cm to approximately 5 cm, preferably of approximately 1.5 cm.

The support elements 116 shown in FIGS. 8 to 11 preferably comprise hot-dip galvanized steel.

Support elements 116 of the base unit 102 can thus preferably be produced particularly easily and inexpensively from hot-dip galvanized steel profile elements 281.

The support element 116 shown in FIGS. 8 and 9 essentially corresponds to the support element 116 shown in FIGS. 20 and 21.

It may be favorable if the water drainage 222 and/or the cable routing 224 are arranged at least in portions within the annularly closed stiffening portion 254.

The stiffening portion 254 forms, in particular, a stability space 284 of the support elements 116.

In order to arrange cables within the annularly closed stiffening portion 254, the support element shown in FIGS. 8 and 9 preferably comprises one or more elongated holes 280, by means of which an interior space 282 of the annularly closed stiffening portion 254 is accessible for the insertion of cables.

In the case of the support element 116 shown in FIGS. 8 and 9, the annularly closed stiffening portion 254 preferably not only forms the stiffening space 284.

The annularly closed stiffening portion 254 preferably also forms a cable routing space 286.

As can be clearly seen in FIGS. 8 to 11, an elongated lighting element 244 is provided in each case, which covers the water drainage 222 and/or the cable routing 224.

In the case of the support element 116 shown in FIGS. 8 to 9, the elongated lighting element 244 is arranged directly on the profile steel element 281.

In the case of the support elements 116 shown in FIGS. 10 and 11, the elongated lighting elements 244 are preferably arranged on a separating profile 245.

The separating profiles 245 can be, for example, H-profiles or a U-profile.

It may be favorable if the separating profiles 245 are made and/or formed from an opaque material.

The separating profiles 245 preferably each comprise or form a lighting space wall element which separates the lighting space 242 from the cable routing space 286 and/or a fluid routing space 288.

It may be particularly favorable if the elongated lighting elements 244 are arranged on a side of the separating profiles 245 facing away from the water drainage 222 and/or the cable routing 224, so that the water drainage 222 and/or the cable routing can be completely covered by the lighting region 226.

The base unit 102 preferably comprises one or more translucent cover elements 246, which can be arranged on the support elements 116 to cover a lighting space 242.

In the case of the support elements 116 shown in FIGS. 8, 9 and 11, no translucent cover elements 246 are shown. The transparent cover element 246 shown in FIG. 10 can, however, also be arranged on the support elements 116 shown in FIGS. 8, 9 and 11.

Translucent cover elements 246 can preferably be connected to the support elements 116 in a form-fitting and/or force-fitting manner, for example by clipping.

In the embodiment of the support element 116 shown in FIG. 10, the translucent cover element 246 can preferably be fixed to the support element 116 by means of two clamping, clips and/or screw rails 290.

In a particularly vandalism-proof configuration of the base unit 102, it can be provided that translucent cover elements 246 are or become fixed to the support elements 116 by means of screw rails 290 which are screwed to the support elements 116 by means of screw elements (not shown), for example grub screws.

Figure 6:
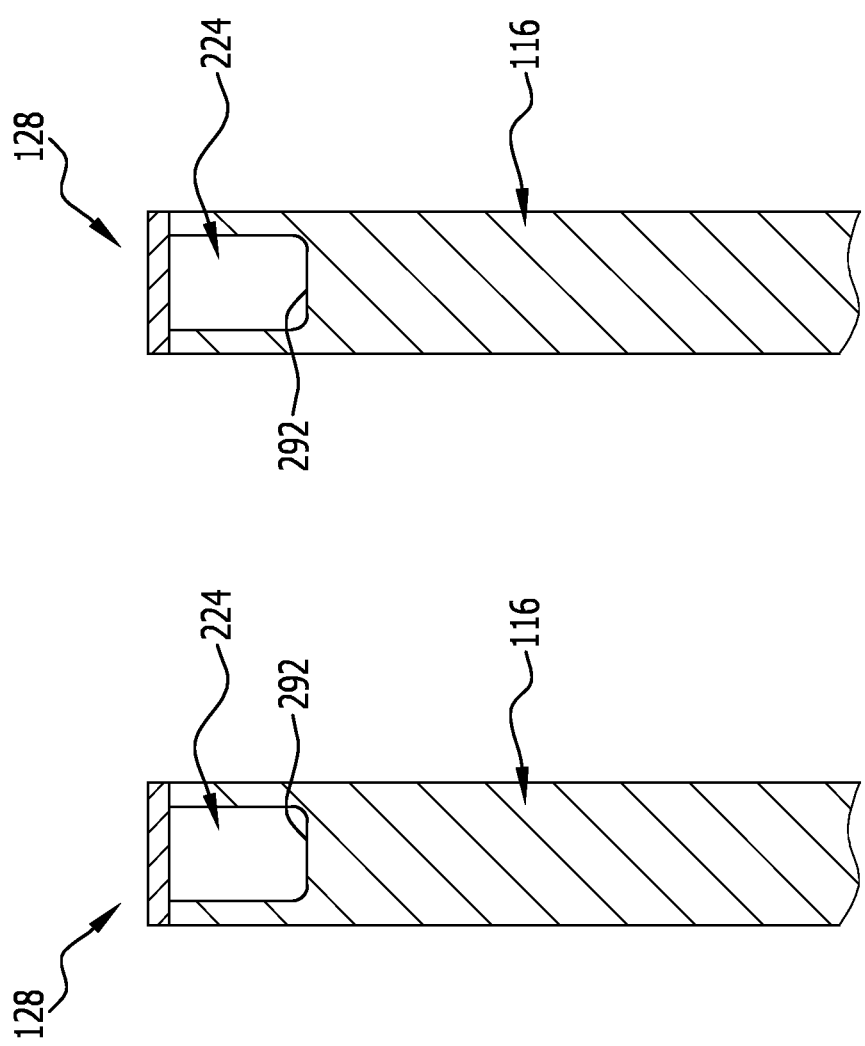
FIG. 6 is a schematic section through a support element of a base unit for an infrastructure device.
Figure 7:
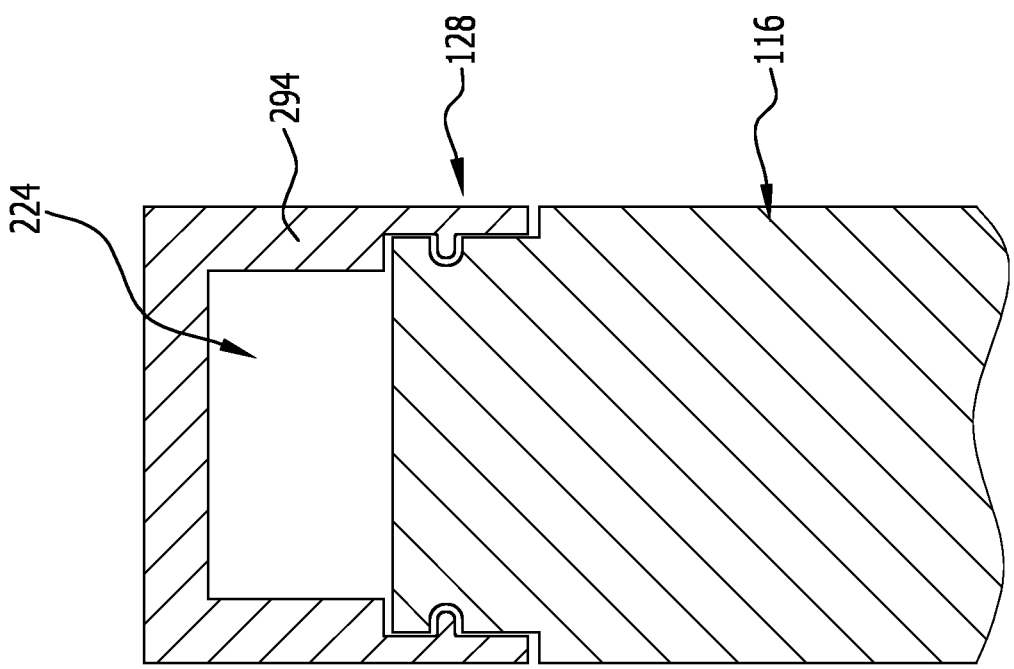
FIG. 7 is a schematic section through a further support element for a base unit for an infrastructure device.

In FIGS. 6 and 7, a particularly cost-effective way of providing a cable routing 224 is also shown.

FIG. 6 shows, for example, two support elements 116 arranged directly next to one another, which preferably each include a groove 292 in which the cable routing 224 runs at least in portions.

The groove 292 is arranged in particular on a rear side 128 of the support elements 116 and can preferably be closed after arranging one or more cables in the groove 292.

It may also be favorable if the cable routing 224 runs in a groove 292 of a support element 116, wherein the water drainage 222 runs in the groove 292 of the respective other support element 116.

FIG. 7 shows a section through a support element 116 on which a cable channel strip 294 is fixed in a form-fitting and/or force-fitting manner.

The cable channel strip 294 is preferably clipped onto a rear side 128 of the support element 116.

The base units 102 shown in FIGS. 4 and 5 preferably comprise or form a circumferential roof edge 296.

Figure 24:
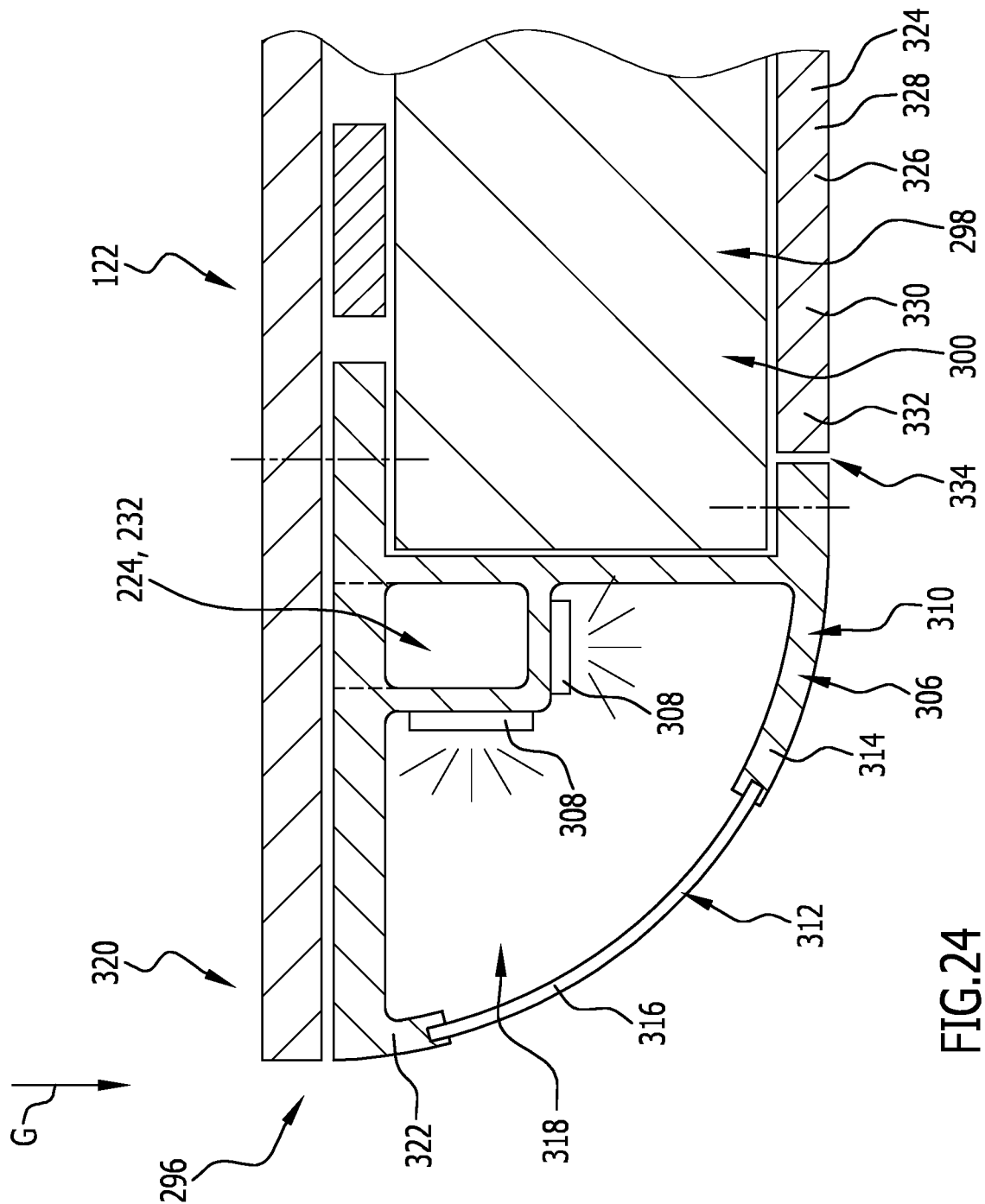
FIG. 24 is a schematic section through a roof edge lighting of a base unit for an infrastructure device.

It can be particularly advantageous if all of the roof elements 118 of the base unit 102 are surrounded by a common support frame element 298 in a main plane of extension of the roof elements 118 (cf. FIG. 24).

The support frame element 298 in particular forms a circumferential roof frame 300 of the roof elements 118.

The lighting region 226 of the base units 102 illustrated in FIGS. 4 and 5 preferably comprises a roof edge lighting 302, which is arranged along the circumferential roof edge 296.

In the base units 102 shown in FIGS. 4 and 5, the circumferential roof edge 296 preferably protrudes away from the support elements 116 in a main plane of extension of the roof elements 118 in a transverse direction 154 and in a direction perpendicular to the transverse direction 154.

The circumferential roof edge 296 forms in particular a projecting roof edge 304.

It may be favorable if the roof edge lighting 302 comprises a plurality of roof edge lighting elements 306 which may be arranged on the circumferential roof edge 296.

A roof edge lighting element 306 of this type is shown by way of example in FIG. 24.

Preferably, a plurality of roof edge lighting elements 306 can be arranged next to one another on the circumferential roof edge 296, in particular can be attached or pushed on next to one another on the roof edge 296 and/or the common support frame element 298 and/or the roof frame 300.

Roof edge lighting elements 306 arranged on the roof edge 296 and/or attached to and/or pushed onto this may preferably be screwed to the common support frame element 298 and/or a bearing structure of the roof 122.

Each roof edge lighting element 306 preferably comprises a plurality of lighting elements 308.

Each roof edge lighting element 306 preferably further comprises an opaque region 310 and a translucent region 312 arranged on the opaque region 310.

The opaque region 310 of the roof edge lighting element 306 preferably forms a frame element 314 for the transparent region 312. The translucent region 312 preferably comprises a transparent element 316 or is formed by this.

The opaque region 310 and the translucent region 312 of the roof edge lighting elements 306 preferably each delimit an interior space 318 of the roof edge lighting elements 306.

Preferably, the opaque region 310 and/or the translucent region 312 are curved at least in certain regions, so that the roof edge lighting elements 306 can in particular give a rounded impression of the roof edge 296.

As an alternative to this, it is conceivable that the translucent region 312 is not curved and extends essentially along a plane.

It may be favorable if the lighting elements 308 of a roof edge lighting element 306 are arranged in the interior space 318 of the roof edge lighting elements 306.

It may be favorable if each roof edge lighting element 306 comprises a cable routing portion 232 of the cable routing 224.

The cable routing portion 232 of the cable routing 224 is preferably arranged in the opaque region 310 of each roof edge lighting element 306.

Cables may thus preferably be passed through cable routing portions 232 of roof edge lighting elements 306 arranged next to one another on the circumferential roof edge 296, wherein lighting elements 308 of roof edge lighting 302 preferably are able to be connected by means of a ring circuit.

As indicated in FIG. 24 by means of dashed lines, the cable routing portion 232 of the cable routing 224 can be designed to be open in an upper region in the direction of gravitational force G. Cable routing through the cable routing portion 232 of the roof edge lighting element 306 can thus preferably be facilitated.

The base unit 102, in particular a roof 122 thereof, preferably comprises an overhanging roof region 320 which is arranged in the direction of gravitational force G above the roof edge lighting elements 306 arranged on the circumferential roof edge 296 and which in particular completely covers them.

The roof edge lighting elements 306, which are in particular plastic components 322, can preferably be protected from precipitation, for example hail, snow or rain.

It may be favorable if the roof edge lighting elements 306 encompass the overhanging roof region 320 in an region arranged perpendicular to the direction of gravitational force G. It can thus preferably be achieved that an edge between the roof edge lighting elements 306 and the overhanging roof region 320 is only visible from an upper side of the roof 122.

As can be clearly seen in FIGS. 5 and 24, an underside of the roof 122 can comprise a roof cladding 324.

In the case of the base unit 102 shown in FIG. 5, the lighting region 226 extends at least in some regions along the support elements 116 in the region of the roof 122 and/or along roof supporting elements 252 in the region of the roof 122.

It is conceivable that one or more ventilation openings are provided in the roof cladding 324 and/or in the roof edge lighting 304, by means of which a cavity of the roof 122 covered by the roof cladding 324 can be ventilated.

The roof cladding 324 preferably comprises a film 326 or a membrane 328.

As an alternative or in addition to a film 326 and/or a membrane 328, it can be provided that the roof cladding 324 comprises a sandwich component 330, in particular a sandwich sheet 332.

A cover lip and/or sealing lip, not shown in the figures, by means of which the joint edge 334 can be covered, is preferably arranged on a joint edge 334 between the roof cladding 324 and the roof edge lighting elements 306.

Figure 15:
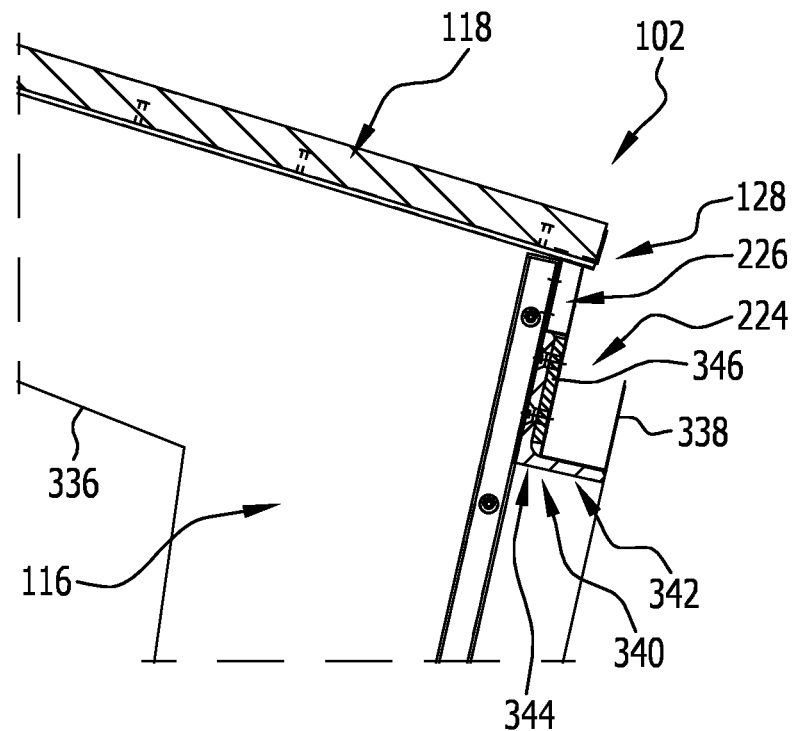
FIG. 15 is a schematic section through a further embodiment of a base unit for an infrastructure device.
Figure 16:
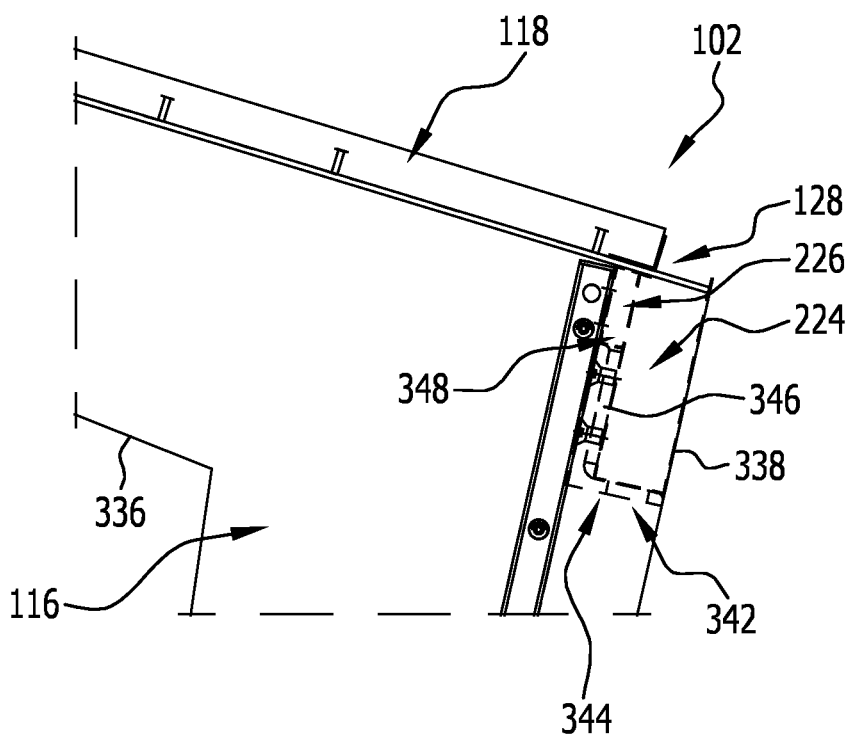
FIG. 16 is a schematic side view of the base unit of FIG. 15.
Figure 17:
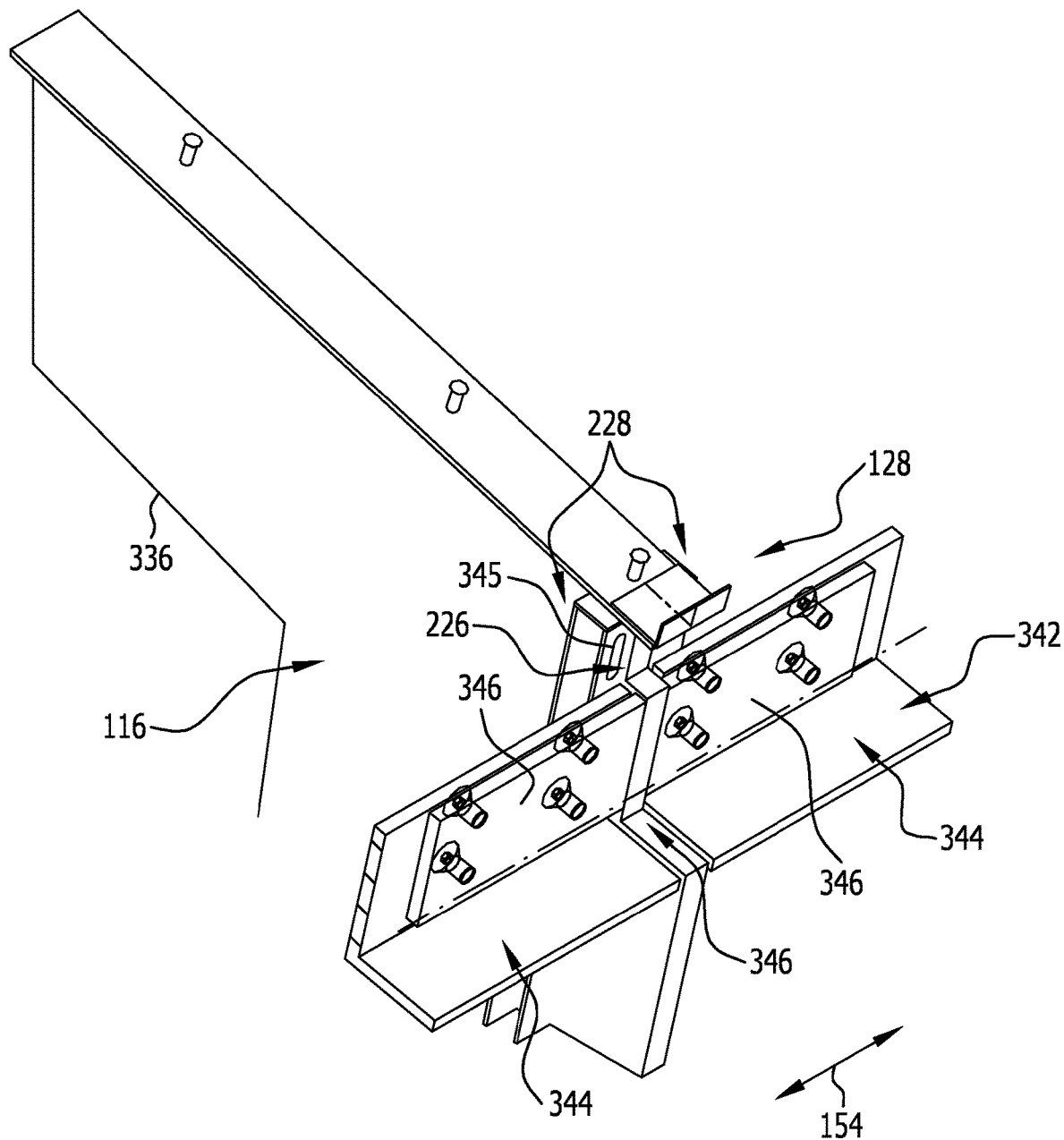
FIG. 17 is a schematic perspective illustration of a detail of the base unit from FIGS. 15 and 16.

FIGS. 15 to 17 show an embodiment of a base unit which comprises support elements 116 which are arranged in the transverse direction 154 along an imaginary line.

Preferably, the support elements 160 each partially, in particular completely, cover one another with an outer contour in the transverse direction 154.

The base unit 102 preferably comprises a water drainage line 338 of the water drainage 222, which is arranged in the transverse direction 154 within the outer contour 336 of the support elements 116.

If the base unit 102 comprises three or more than three support elements which are arranged in the transverse direction 154 along an imaginary line, two outer support elements 116 in the transverse direction 154 and one or more inner support elements 116 arranged in the transverse direction 154 between the outer support elements 116 are preferably provided.

Inner support elements arranged in the transverse direction 154 between the support elements 116 preferably comprise a recess 340 for the water drainage line 338.

FIG. 15 shows a support element 116 and the water drainage line 338 arranged in the recess 340.

It may be favorable if the outer support elements 116 do not comprise a recess 340 and thus completely cover and/or overlap the inner support elements 116 in the transverse direction 154 (cf. FIG. 16).

The base unit 102 shown in FIGS. 15 and 16 preferably comprises a water drainage line receptacle 342 to which the water drainage line 338 is fixed.

It may be favorable here if the roof elements 118 act on the water drainage line 338 in the direction of the water drainage line receptacle 342.

The water drainage line 338 preferably comprises a seam region on which the water drainage line 338 has a seam. The roof elements 118 preferably rest indirectly, in particular on an elastic sealing element arranged on the seam and/or seam region, on the seam and/or on the seam region.

The water drainage line 338 can thus preferably be fixed in the water drainage line receptacle 342 in a vandalism-proof manner by means of the roof elements 118.

The water drainage line receptacle 342 preferably comprises several angle elements 344 which are fixed on a rear side 128 of the support elements 116, for example by means of screws (cf. FIGS. 15 to 17).

As can be clearly seen in FIG. 17, an elongated profile element 228, shown for example in FIG. 28, can be arranged on sides of a support element 116 facing away from one another.

By means of such a profile element 228 shown in FIG. 28, cables 182 can preferably be fed from the housing device 148 through the sleeve 188 to a cable routing portion 232 and/or a cable routing space 286 of the elongated profile element 228, for example via a cable feedthrough opening 345 only indicated by dashed lines in FIG. 28.

Cables 182 can then be routed out of the elongated profile element 228 at a further cable feedthrough opening 345 of an elongated profile element 228, for example to a cavity 348 formed behind the water drainage line 338.

One or more spacer elements 346 can be arranged between the angle elements 344 and the water drainage line 338.

Passage openings arranged in the angle elements 344 for the passage of screws can be covered from the side facing away from the spacer elements 346, preferably by means of a cover plate not shown in the figures.

The screws can thus preferably be clad in a particularly vandalism-proof manner.

It has also proven to be favorable if the cavity 348 is formed between the cover plate (not shown in the figures) and the water drainage line 338, which cavity forms the cable routing 224 at least in portions.

Cables, in particular electrical connection cables and/or data cables, can thus preferably be passed through the cavity 348 in the transverse direction 154.

Figure 18:
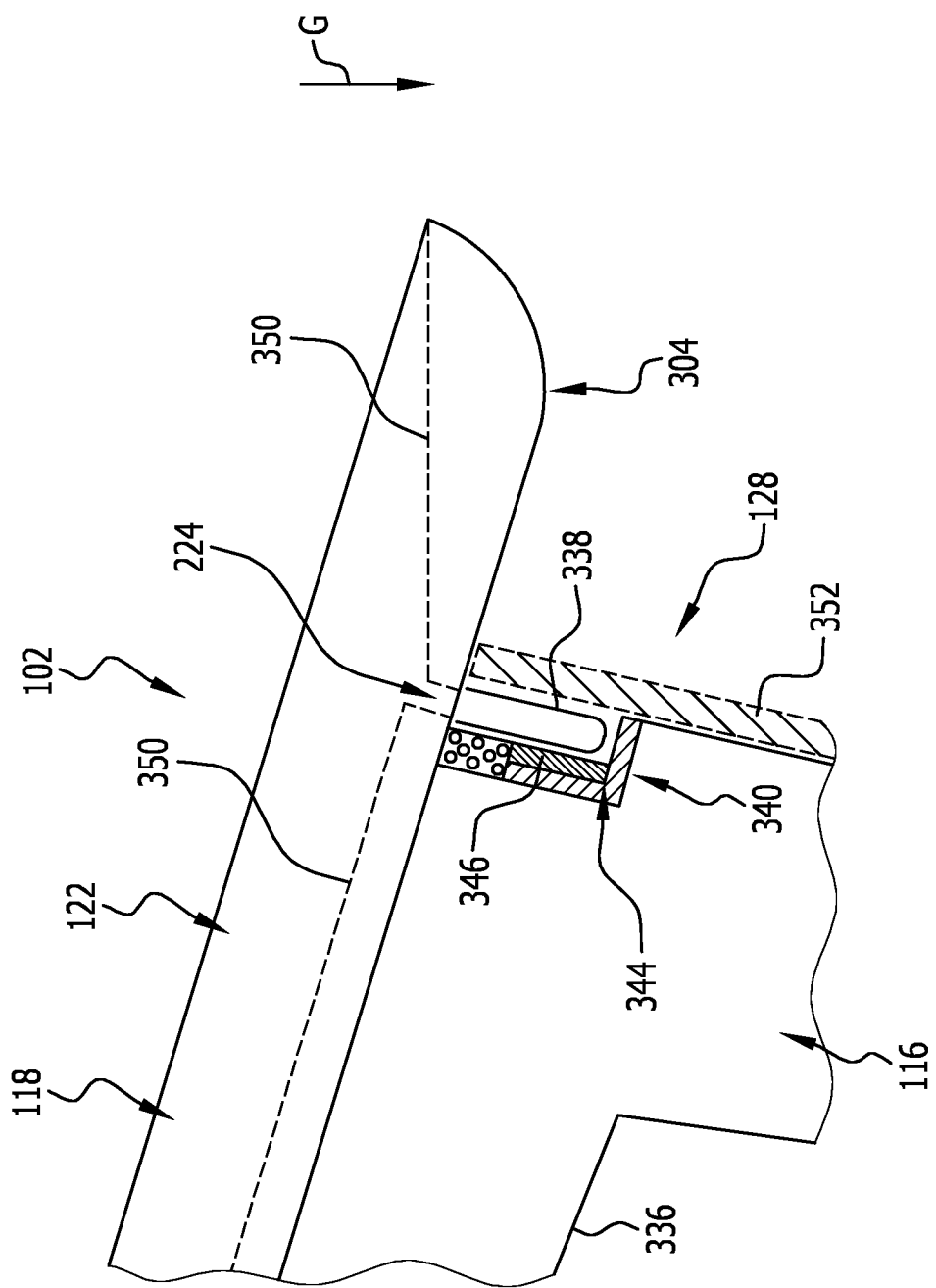
FIG. 18 is a schematic section through a further embodiment of a base unit for an infrastructure device.

The embodiment of the base unit 102 shown in FIG. 18 corresponds substantially to the embodiment of the base unit 102 shown in FIGS. 15 to 17.

However, the base unit 102 illustrated in FIG. 18 preferably comprises an overhanging roof edge 304.

In order to still be able to conduct liquid, in particular water, from the overhanging roof region 320 into the water drainage line 338, it can be provided that the roof elements 118 and/or the roof 122 comprise or form a liquid-tight cover layer 350, wherein the water drainage line 338 is arranged at a lowest point of the liquid-tight cover layer 350 in the direction of gravitational force G.

The liquid-tight cover layer 350 of the roof 122 of the base unit 102 shown in FIG. 18 preferably has a slope towards the water drainage line 338 at each point on the roof 122.

In the embodiment of the base unit 102 shown in FIG. 18, it can furthermore be provided that the base unit 102 comprises a rear wall element 352 on the rear side 128 of the support elements 116, by means of which the base unit 102 can be clad on its rear side 128.

It may be favorable if the rear wall element 352 completely covers the water drainage line 338.

Figure 19:
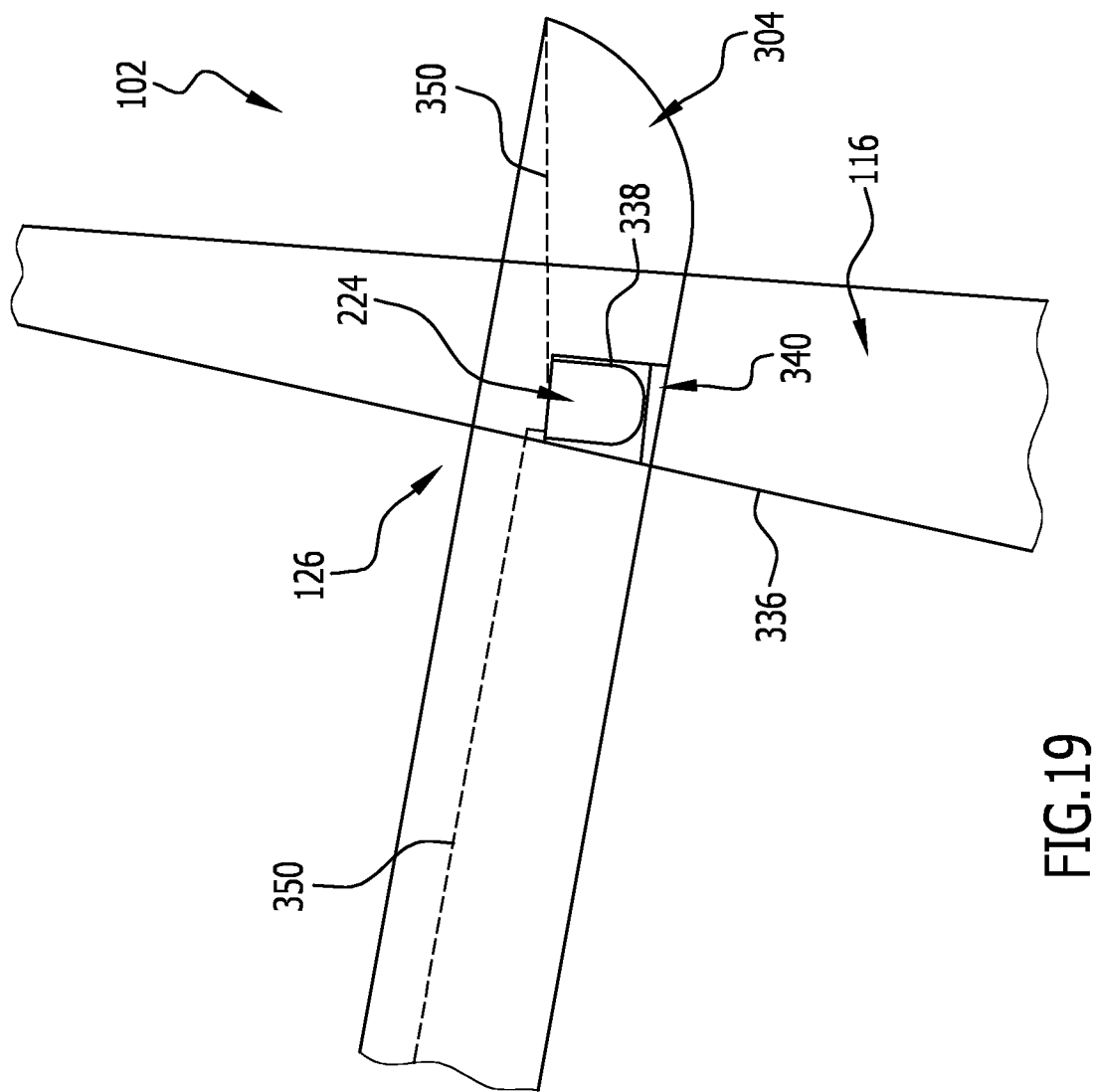
FIG. 19 is a schematic section through a further embodiment of a base unit for an infrastructure device.

The embodiment of the base unit 102 shown in FIG. 19 differs from the embodiment of the base unit 102 shown in FIG. 18 substantially in that the water drainage line is arranged in a recess 340 on a front side 126 of the support elements 116.

A charge status display of the infrastructure device 100 can preferably be provided by the lighting region 226 and/or by the lighting device 227, in particular for displaying a charge status of a battery of an electric vehicle 107 to be charged and/or a charging function of an infrastructure unit 104.

It has also proven to be favorable if a lighting situation of the infrastructure device 100 can be controlled by means of the control device 158 of the infrastructure device 100, for example by adapting the lighting of the lighting region 226, in particular by adapting the floor edge lighting 192, the roof edge lighting 302, and/or the lighting spaces 242 arranged on or in support elements 116.

A base unit 102 can preferably be provided overall for an infrastructure device 100 which, on the one hand, can be produced in a straightforward and cost-effective manner and which, on the other hand, is designed to be visually appealing and vandalism-proof.

LIST OF REFERENCE NUMERALS

100 Infrastructure device
102 Base unit

104 Infrastructure unit
106 Electric charging column
107 Electric vehicle
108 Locker device
110 Vending machine
112 Bench device
114 Screen
116 Support element
118 Roof element
120 Floor
122 Roof
124 Horizontal direction
126 Front
128 Back
130 Edge region
132 Occupied area
134 Person
136 Foundation
138 Floor plate
140 Photovoltaic element
142 Collision protection device
144 Curb boundary
146 Metal bracket element
148 Housing device
150 Seat
152 Locker
154 Transverse direction
156 Receptacle
158 Control device
160 Inverter device
162 Energy storage device
164 Communication device
165 Power electronics
166 Battery
168 Drawer
170 Material thickness
172 Thermal insulation device
174 Bench temperature control device
176 Seat heating device
178 Connection device
180 Feedthrough opening
182 Cable
184 Connection cable
186 Data cable
188 Sleeve
190 Curb
192 Floor edge lighting
194 Infrastructure system
196 Control system
198 Separating region
200 Access region
202 Staying area
204 Charging cable provision device
206 Charging cable receptacle space
208 Sensor device
210 Charging station
211 Charging region
212 Camera
214 Charging control unit
216 Charging cable unit
218 Delimiting element
220 Bollard
222 Drainage
224 Cable routing
226 Lighting region
227 Lighting device
228 Elongated profile element
230 Fastening element
232 Cable routing portion
234 Water drainage portion
236 Lighting portion
238 Opaque wall element
240 Metal profile element
242 Lighting room
244 Elongated lighting element
246 Translucent cover element
248 Locking element
249 Dividing profile element
250 Supporting element
252 Roof supporting element
254 Stiffening portion
256 Supporting element region
258 Insertion receptacle
260 Passage opening
262 Rib element
264 Longitudinal central axis
266 Receptacle opening
268 Bolt element
270 Securing element
272 Splint
274 Notched region
276 Outer contour
278 Joint region
279 Profile element
280 Elongated hole
281 Profile steel element
282 Interior
284 Stability space
286 Cable routing space
288 Fluid routing space
290 Screw rail
292 Groove
294 Cable channel strip
296 Roof edge
298 Support frame element
300 Roof frame
302 Roof edge lighting
304 Overhanging roof edge
306 Roof edge lighting element
308 Lighting element
310 Opaque region
312 Translucent region
314 Frame element
316 Transparent element
318 Interior
320 Overhanging roof region
322 Plastic component
324 Roof cladding
326 Film
328 Membrane
330 Sandwich component
332 Sandwich sheet
334 Joint edge
336 Outer contour
338 Water drainage pipe
340 Recess
342 Water drainage pipe receptacle
344 Angle element
345 Cable feedthrough opening
346 Spacer element
348 Cavity
350 Liquid-tight top layer
352 Back wall element
G Direction of gravitational force

The invention claimed is:

1. A base unit (102) for an infrastructure device (100),
wherein the base unit (102) comprises a plurality of support elements (116) and one or more roof elements (118) arranged on the support elements (116),
wherein the support elements (116) and the one or more roof elements (118) are arranged and designed such that the one or more roof elements (118) are capable of being arranged at a distance from a floor (120) by means of the support elements (116),
wherein the base unit (102) comprises a water drainage (222) and a cable routing (224) and a lighting region (226) and roof elements (118) arranged obliquely in relation to the direction of gravitational force (G), and
wherein the cable routing (224) and the lighting region (226) and the water drainage (222) are arranged at least in portions within one or more support elements (116), wherein a water drainage line (338) of the water drainage (222) is arranged in a transverse direction (154) within the outer contour (276) of the support elements (116), and wherein
a) the water drainage (222) and the cable routing (224) are arranged at least in portions behind the lighting region (226) and at least in portions are covered by the lighting region (226); and wherein
b) a plurality of support elements (116) of the base unit (102) are arranged in a transverse direction (154) along an imaginary line and each at least partially overlap in an overlapping region in the transverse direction (154), wherein the water drainage (222) and the cable routing (224) runs at least in portions in the transverse direction (154), wherein the water drainage (222) and cable routing (224) running at least in portions in the transverse direction (154) are arranged at least partially within the overlapping region.

2. The base unit (102) as claimed in claim 1, wherein
a) a plurality of support elements (116) are arranged in a transverse direction (154) along an imaginary line, wherein the support elements (116) having an outer contour (276) in the transverse direction (154) each partially overlap,
and wherein
b) the base unit (102) comprises three or more than three support elements (116) which are arranged in a transverse direction (154) along an imaginary line, wherein the three or more than three support elements (116) comprise two outer support elements (116) in the transverse direction (154) and one or more inner support elements (116) arranged in the transverse direction (154) between the outer support elements (116), and inner support elements (116) arranged in the transverse direction (154) between the outer support elements (116) comprise a recess for a water drainage line (338) of the water drainage (222).

3. The base unit (102) as claimed in claim 1, wherein
a) the roof elements (118) comprise or form a liquid-tight cover layer (350), wherein a water drainage line (338) of the water drainage (222) is arranged at a lowest point of the liquid-tight cover layer (350) in the direction of gravitational force (G); and
b) an elastic sealing element is arranged on a water drainage line (338) of the water drainage (222), wherein one or more roof elements (118) rest against the elastic sealing element; and c) the water drainage line (338) of the water drainage (222) is fixed by one or more roof elements (118) on a water drainage line receptacle (342) of the base unit (102); and
d) the water drainage line (338) of the water drainage (222) is arranged in a recess in one or more support elements (116).

4. The base unit (102) as claimed in claim 1, wherein
a) each support element (116) comprises one or more at least approximately flat supporting elements (250), said one or more at least approximately flat supporting elements (250) are or can be connected to one another; and
b) the base unit (102) comprises one or more roof supporting elements (252), wherein one or more roof elements (118) each are supported by means of one or more roof supporting elements (252), and
i) the one or more roof supporting elements (252) are each arranged between two supporting elements (250) of one or more support elements (116); and
ii) the one or more support elements (116) comprise bolt elements (268) protruding in a transverse direction (154), wherein roof supporting elements (252) are each attachable to a bolt element (268), said bolt element (268) is designed to support the roof supporting elements (252) against the direction of gravitational force (G), and wherein the roof supporting elements (252) can be braced perpendicular to the direction of gravity (G) by means of the bolt elements (268) on the support elements (116).

5. The base unit (102) as claimed in claim 1, wherein
a) one or more support elements (116) comprise or are formed from one or more profile elements (279); or
b) one or more support elements (116) comprise or are formed from one or more bent sheet metal parts; and
c) the base unit (102) comprises a lighting device (227), said lighting device (227) has one or more elongated lighting elements (244), wherein one or more elongated lighting elements (244) are arranged on one side of a support element (116) or on two opposite sides of a support element (116) or wherein one or more elongated lighting elements (244) are at least partially integrated into a respective support element (116); and
d) the base unit (102) comprises one or more elongated profile elements (228), said one or more elongated profile elements (228) are arranged on one or more support elements (116), each of which has a cable routing portion (232) of the cable routing (224) and a water drainage portion (234) of the water drainage (222), wherein the elongated profile elements (228) each comprise a lighting portion (236) of the lighting region (226), said lighting portion (236) of the lighting region (226) covers the cable routing portion (232) or covers the water drainage portion (234).

6. The base unit (102) as claimed in claim 1, wherein each support element (116) comprises two or more than two flat supporting elements (250), wherein one or more elongated lighting elements (244) are arranged in a lighting space (242) between the two or more than two flat supporting elements (250), wherein one or more translucent cover elements (246) are provided, said one or more translucent cover elements (246) cover the lighting space (242), and wherein one or more, support elements (116) have a stability space (284), one or more lighting spaces (242) for receiving lighting elements (244, 308) and one cable routing space (286) and fluid routing space (288) arranged between the stability space (284) and a respective lighting space (242).

7. The base unit (102) as claimed in claim 1, wherein
   a) a projection of an edge region (130) of the one or more roof elements (118) forms parallel to the direction of gravitational force (G) an occupied area (132) for people (134) arranged on a plane perpendicular to the direction of gravitational force (G); and
   b) the base unit (102) comprises one or more rear wall elements (352) or side wall elements arranged on the support elements (116); and
   c) the base unit (102) comprises a foundation (136) and a floor plate (138), wherein the support elements (116) of the base unit (102) are or can be anchored to the foundation (136) or to the floor plate (138).

8. The base unit (102) as claimed in claim 1, wherein
   a) the support elements (116) comprise a groove (292), in said groove (292) the cable routing (224) runs at least in portions; and
   b) the cable routing (224) comprises one or more cable channel strips (294), said cable channel strips (294) can be fixed to the support elements (116) in a form-fitting or force-fitting manner.

9. The base unit (102) as claimed in claim 1, wherein
   a) the one or more roof elements (118) form a coherent roof (122) of the base unit (102), wherein an underside of the roof (122) comprises a roof cladding (324) and the roof cladding (324) comprises a film (326) or a membrane (328); and
   b) all roof elements (118) of the base unit (102) are surrounded by a common support frame element (298) in a main plane of extension of the roof elements (118).

10. An infrastructure device (100), comprising one or more base units (102) as claimed in claim 1, wherein the infrastructure device (100) is arranged for supplying vehicles with fuel or electricity and further includes one or more infrastructure units (104).

11. The base unit (102) as claimed in claim 1, wherein one or more roof elements (118) comprise and form a circumferential roof edge (296), wherein the lighting region (226) comprises roof edge lighting (302) arranged along the circumferential roof edge (296), and
   i) the circumferential roof edge (296) protrudes in a main plane of extension of the roof elements (118) in a transverse direction (154) from outer support elements (116) of the base unit (102) or that the circumferential roof edge (296) protrudes in a main plane of extension of the roof elements (118) perpendicular to the transverse direction (154) away from one or more support elements (116); and,
   ii) the roof edge lighting (302) comprises one or more roof edge lighting elements (306), said one or more roof edge lighting elements (306) can be arranged on the circumferential roof edge (296) and each roof edge lighting element (306) comprises one or more lighting elements (308).

12. The base unit (102) as claimed in claim 1, wherein
   a) one or more support elements (116) comprise or are formed from one or profile steel elements (281); or
   b) one or more support elements (116) comprise or are formed from one or more bent sheet metal parts with canted sheet metal edges.

13. An infrastructure device (100) comprising at least one base unit (102),
   wherein the base unit (102) comprises a plurality of support elements (116) and one or more roof elements (118) a ranged on the support elements (116)
   wherein the support elements (116) and the one or more roof elements (118) are arranged and designed such that the one or more roof elements (118) are capable of being arranged at a distance from a floor (120) by means of the support elements (116),
   wherein the base unit (102) comprises a water drainage (222) and a cable routing (224) and a lighting region (226) and roof elements (118) arranged obliquely in relation to the direction of gravitational force (G), and
   wherein the cable routing (224) and the lighting region (226) and the water drainage (222) are arranged at least in portions within one or more support elements (116), wherein a water drainage line (338) of the water drainage (222) is arranged in a transverse direction (154) within the outer contour (276) of the support elements (116),
   and wherein the water drainage (222) and the cable routing (224) are arranged at least in portions behind a lighting region (226) and at least in portions are covered by a lighting region (226);
   and wherein a plurality of support elements (116) of the base unit (102) are arranged in a transverse direction (154) along an imaginary line and each at least partially overlap in an overlapping region in the transverse direction (154), wherein the water drainage (222) and the cable routing (224) runs at least in portions in the transverse direction (154), wherein the water drainage (222) and cable routing (224) running at least in portions in the transverse direction (154) are ranged at least partially within the overlapping region,
   wherein
   the infrastructure device (100) further comprises one or more photovoltaic elements (140), said one or more photovoltaic elements (140) are formed in particular by roof elements (118) of the one or more base units (102); and wherein the infrastructure device (100) further includes one or more electric charging columns (106) for charging electric vehicles (107).

14. The infrastructure device (100) as claimed in claim 13, wherein the infrastructure device (100) comprises one or more bench seat devices (112) or one or more locker devices (108), wherein one or more bench seat devices (112) or one or more locker devices (108) each comprise a housing device (148), wherein one or more control devices (158) or one or more inverter devices (160) or one or more energy storage devices (162) or one or more communication devices (164) of the infrastructure device (100) are arranged in the housing device (148), and wherein
   a) housing devices (148) of the one or more bench devices (112) or of the one or more locker devices (108) each comprise a thermal insulation device (172); and
   b) the housing devices (148) of the one or more bench devices (112) or the one or more locker devices (108) can be anchored in a floor (120) by means of one or more fastening elements (230); and
   c) the housing devices (148) of the one or more bench devices (112) or of the one or more locker devices (108) comprise a receptacle (156) for receiving one or more control devices (158) or one or more inverter devices (160) or one or more energy storage devices (162) or one or more communication devices (164) of the infrastructure device (100), wherein the receptacle (156) is designed as a drawer (168).

15. The infrastructure device (100) as claimed in claim 13, wherein
   a) one or more infrastructure units (104) are arranged completely within a projection of an edge region (130) of the one or more roof elements (118) of the one or more base units (102) parallel to the direction of gravitational force (G) on a plane arranged perpendicular to the direction of gravitational force (G); and b) the infrastructure device (100) comprises a foundation (136) or a floor plate (138), wherein the support elements (116) of the one or more base units (102) are anchored in the foundation (136) or in the floor plate (138); and c) the infrastructure device (100) comprises one or more curbs (190), which at least partially surround a foundation (136) of the infrastructure device (100), or that the infrastructure device (100) comprises a floor plate (138), on said a floor plate (138) the support elements (116) of the one or more base units (102) are arranged, wherein the infrastructure device (100) comprises floor edge lighting (192), said floor edge lighting (192) runs at least partially along the one or more of the plurality of curbs (190) or runs along an edge of the floor plate (138); and d) the support elements (116) of the one or more base units (102) form one or more separating regions (198), said one or more separating regions (198) not being passable by a vehicle.

16. The infrastructure device (100) as claimed in claim 13, wherein a) the infrastructure device (100) comprises one or more infrastructure units (104), each of said one or more infrastructure units (104) comprises a charging control unit (214) and a charging cable unit (216), wherein the charging cable unit (216) is arranged at a distance from the charging control unit (214) and comprises a charging plug for charging an electric vehicle (107), and wherein charging control units (214) of one or more infrastructure units (100) are arranged in the region of a roof (122) formed by one or more roof elements (118) of the one or more base units (102); and b) the infrastructure device (100) comprises one or more charging cable provision devices (204) for providing a charging cable of an infrastructure unit (100) in each case; and c) the infrastructure device (100) comprises a sensor device (208) for detecting an occupancy of one or more charging stations (210) or one or more charging regions (211) of the infrastructure device (100); and d) the infrastructure device (100) comprises a control device (158) and by means of said control device (158) a lighting situation of the infrastructure device (100) can be controlled; and e) the infrastructure device (100) comprises a charge status display for displaying a charge status of a battery of an electric vehicle (107) to be charged or a charging function of an infrastructure unit (104), wherein the charge status indicator is arranged on or in a support element (116), said support element (116) being arranged adjacent to a respective charging station (210) or charging region (211).

17. An infrastructure system (194), comprising one or more infrastructure facilities (100) as claimed in claim 13.

18. The infrastructure device (100) as claimed in claim 13, wherein the infrastructure device (100) comprises a collision protection device (142), by means of which one or more infrastructure units (104) are protected from a collision with a vehicle (107);

wherein housing devices (148) of the one or more bench devices (112) or one or more locker devices (108) form a collision protection device (142) for one or more infrastructure units (104) of the infrastructure device (100) and housing devices (148) of the one or more bench devices (112) or of the one or more locker devices (108) are arranged to form the collision protection device (142) between two electric charging columns (106) for charging electric vehicles (107).

\* \* \* \* \*